United States Patent
Buer

(10) Patent No.: US 12,438,603 B2
(45) Date of Patent: Oct. 7, 2025

(54) MODULATING SATELLITE CAPACITY

(71) Applicant: Viasat Inc., Carlsbad, CA (US)

(72) Inventor: Kenneth V. Buer, Bluff City, TN (US)

(73) Assignee: Viasat, Inc., Carlsbad, CA (US)

(*) Notice: Subject to any disclaimer, the term of this patent is extended or adjusted under 35 U.S.C. 154(b) by 382 days.

(21) Appl. No.: 18/245,745

(22) PCT Filed: Sep. 23, 2020

(86) PCT No.: PCT/US2020/052341
§ 371 (c)(1),
(2) Date: Mar. 17, 2023

(87) PCT Pub. No.: WO2022/066154
PCT Pub. Date: Mar. 31, 2022

(65) Prior Publication Data
US 2023/0361861 A1 Nov. 9, 2023

(51) Int. Cl.
*H04B 7/185* (2006.01)
*B64G 1/10* (2006.01)
(Continued)

(52) U.S. Cl.
CPC ....... *H04B 7/18515* (2013.01); *B64G 1/1007* (2013.01); *B64G 1/427* (2013.01);
(Continued)

(58) Field of Classification Search
CPC ............ H04B 7/18515; H04B 7/18519; H04B 7/18597; B64G 1/1007; B64G 1/427; B64G 1/428; B64G 1/44
See application file for complete search history.

(56) References Cited

U.S. PATENT DOCUMENTS

| 4,572,864 A * | 2/1986 | Benson ............... C09K 5/00 428/116 |
| 5,142,884 A | 9/1992 | Scaringe et al. |

(Continued)

FOREIGN PATENT DOCUMENTS

| EP | 891926 A1 * | 1/1999 | ............ B64G 1/50 |
| WO | WO 1999/00868 | 6/1998 | |
| WO | WO 2001/20788 A1 | 3/2001 | |

OTHER PUBLICATIONS

International Search Report and Written Opinion, PCT/US2020/052341, dated Jun. 15, 2021, 13 pages.
(Continued)

*Primary Examiner* — Raymond S Dean
(74) *Attorney, Agent, or Firm* — Holland & Hart LLP

(57) ABSTRACT

Methods, systems, and devices for satellite operations are described. A system for satellite communications may include a payload, a power system, and a thermal management component. The payload may be configured to provide a service with varying levels of capacity based on a demand profile. The payload may consume electrical energy at a peak rate when a level of demand indicated by the demand profile is above a threshold and at a lower, off-peak rate when a level of demand indicated by the demand profile is below a threshold. The peak rate may exceed a rate at which electrical energy is generated by the power system. The thermal management component may process excess thermal energy generated by the payload when the payload operates at the peak rate. Processing the excess thermal energy may include storing thermal energy while the payload operates at the peak rate.

35 Claims, 8 Drawing Sheets

(51) Int. Cl.
  *B64G 1/42* (2006.01)
  *B64G 1/44* (2006.01)
(52) U.S. Cl.
  CPC .............. *B64G 1/428* (2013.01); *B64G 1/44* (2013.01); *H04B 7/18519* (2013.01); *H04B 7/18597* (2013.01)

(56) References Cited

U.S. PATENT DOCUMENTS

| | | | |
|---|---|---|---|
| 5,666,648 | A | 9/1997 | Stuart |
| 5,982,813 | A | 11/1999 | Dutta et al. |
| 11,750,279 | B2 * | 9/2023 | Semiao .............. H04B 7/18517 455/12.1 |
| 2014/0263843 | A1 | 9/2014 | Cappelli et al. |
| 2015/0236781 | A1 * | 8/2015 | Jalali ..................... H04W 84/06 370/252 |
| 2015/0318914 | A1 * | 11/2015 | Scott .................. H04B 7/18513 370/319 |
| 2020/0002026 | A1 * | 1/2020 | Duong ................... F28F 21/08 |

OTHER PUBLICATIONS

Chetty et al., "Topex Electrical Power System", Aerospace Power Systems. Boston, Aug. 4-9, 1991; [Proceedings of the Intersociety Energy Conversion Engineering Conference], New York, IEEE, US, vol. 1, Aug. 4, 1991, pp. 36-44, XP000280425, ISBN: 978-0-89448-163-5.

Reinhardt et al., "Space Power Technology in Power Management and Distribution Electronics", Journal of Spacecraft and Rockets, American Institute of Aeronautics and Astronautics, Reston, VA, US, vol. 35, No. 6, Nov. 1, 1998, pp. 837-844, XP000791567, ISSN: 0022-4650.

* cited by examiner

MODULATING SATELLITE CAPACITY

CROSS REFERENCE

The present application for patent is a 371 national phase filing of International Patent Application No. PCT/US2020/052341 by BUER, entitled "MODULATING SATELLITE CAPACITY" filed Sep. 23, 2020, assigned to the assignee hereof, and expressly incorporated by reference in its entirety herein.

BACKGROUND

The following relates generally to satellite communications and more specifically to modulating a capacity of a satellite.

Satellites that are currently orbiting earth collectively provide a wide range of services to user devices (e.g., communications services, imagery services, positioning services, navigation services, timing services, etc.). A satellite may be capable of concurrently providing a service to multiple users and may communicate a quantity of information between a ground network and the multiple users. The quantity of information supported by a satellite may also be referred to as the capacity of a satellite and may be referred to as a satellite data rate. Satellite data rate may depend on a bandwidth used for communication, power used by the satellite components, or spectral efficiency of the communication links between the satellite and the ground network and users. Demand for satellite communication services may be uneven, for example having periods of higher demand and periods of lower demand. Providing a satellite communications service to users with high demand fluctuation may create challenges in satellite design and operation.

SUMMARY

The described techniques relate to improved methods, systems, devices, and apparatuses that support modulating a capacity of a satellite. A satellite may include a payload (e.g., communications payload) and a structure that supports a payload (e.g., a chassis). Satellite capacity may depend on a bandwidth used for communication, power used by the satellite components, throughput of the satellite components, or spectral efficiency of the communication links between the satellite and the ground network and users. Bandwidth and spectral efficiency may be relatively constant over a time period such as an hour, a day, or a week. In addition, power for the satellite may be provided via a power generation component such as a solar array (e.g., one or more panels of photovoltaic cells) or a nuclear generator (e.g., radioisotope thermoelectric generator). In addition, components of the satellite drawing power may generate heat, which may be generated at a faster rate than it is dissipated into space above a threshold power level, causing a temperature of the payload to increase. Thus, the capacity of the payload may be determined (e.g., limited) by the availability of power, the rate of thermal dissipation, and the thermal limits of the components.

The payload may be configured to provide a communication service with a constant capacity (e.g., a constant maximum data rate). That is, the satellite may be continuously capable of providing a quantity of information based on the available power from the power generation component and may have the ability to dissipate thermal energy generated by the payload. Configuring a payload to operate with a constant capacity may result in the payload having excess unused capacity during periods of low demand. In contrast, the demand may exceed the capacity during periods of high demand, which may result in congestion and a reduced user experience through data management techniques (e.g., traffic shaping, buffering, increased latency) used to manage congestion.

According to aspects described herein, a payload may be configured to modulate its capacity based on a demand profile that represents a demand for a service provided by the payload. That is, the payload may provide a first level of capacity when a demand profile indicates that demand may be above a threshold and a second, smaller level of capacity when the demand profile indicates that demand may be below a threshold. The payload may be capable of providing additional levels of capacity. Additionally, rather than configuring the payload with a power system that supports providing electrical energy at a rate that is sufficient to continuously operate the payload having a fixed capacity, the payload may be configured with a smaller power system that provides an electrical energy at a rate that is based on an average power consumption of the payload. In such cases, energy stored in an energy storage system may be used to meet the electrical energy demands of the payload during periods of high demand. Additionally, or alternatively, rather than configuring the payload with a thermal processing capability to process thermal energy at a rate that is continually generated by the payload having a fixed capacity, the payload may be configured with a smaller thermal processing capability, and the satellite may be configured with a thermal management component that stores excess thermal energy generated by the payload during periods of high demand.

DETAILED DESCRIPTION

Figure 1:
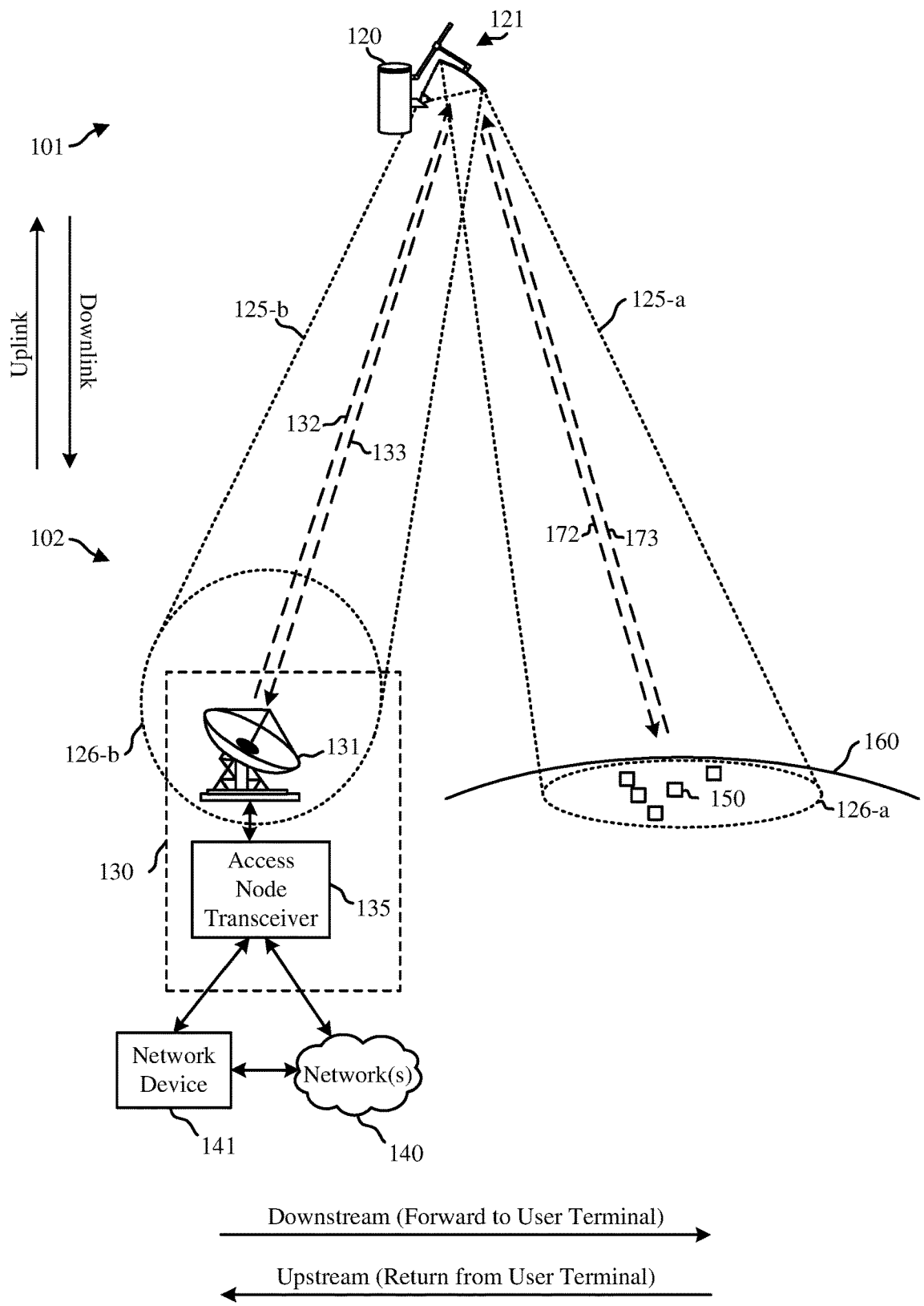
FIG. 1 shows a diagram of a communications system that supports modulating a capacity of a satellite in accordance with examples as disclosed herein.

A payload of a satellite that provides a service (e.g., a communications service) to one or more user terminals may be configured to continuously support the communication of data for the service at a fixed data rate. The fixed supported data rate of a payload may also be referred to as the capacity of the payload, and may be configured by a predicted or estimated "peak" demand for the communications service, or other payload limitations such as available size and power. Payloads that continuously support communicating information at a fixed data rate may continuously operate at a capacity that is capable of supporting a peak demand and may be referred to as having a constant capacity. Payloads that have a constant capacity may also consume electrical energy at a constant rate. Thus, a power system of the satellite that supports the payload may also be configured to supply electrical energy at a rate (or average rate) that matches the constant rate at which the electrical energy is consumed by the payload. Additionally, payloads that have a constant capacity may generate thermal energy at a constant rate based on consuming electrical energy at a constant rate. Thus, the payload may be configured to have a thermal processing capability that is sufficient to process thermal energy at the constant rate the thermal energy is generated by the payload.

But configuring a payload to operate with a constant capacity may result in the payload having excess capacity during periods of low demand. That is, during periods of low demand, the payload may communicate data at a data rate that is less than a maximum data rate, despite the payload currently being configured to communicate at up to the maximum data rate. Thus, a rate at which electrical energy is consumed (and an amount of electrical energy that is consumed) by the payload may be excessive during periods of low demand. Also, a rate at which thermal energy is generated (and an amount of thermal energy generated) by the payload may be excessive during periods of low demand. Additionally, configuring a payload to operate with a constant capacity may result in the payload having insufficient capacity during periods of high demand—e.g., if the demand is higher than expected or exceeds the capacity of the payload.

According to aspects described herein, a payload may be configured to modulate its capacity based on a demand profile that represents a demand for a service provided by the payload. For example, the payload may provide a first level of capacity when a demand profile indicates that demand may be above a threshold and a second, smaller level of capacity when the demand profile indicates that demand may be below a threshold. The payload may be capable of providing additional levels of capacity. Additionally, rather than configuring the payload with a power system that supports providing electrical energy at a rate that is sufficient to continuously operate the payload at a capacity supporting an anticipated peak demand, the payload may be configured with a smaller power system that provides electrical energy at a rate that is based on an average power consumption of the payload. In such cases, energy stored in an energy storage system may be used to meet the electrical energy demands of the payload during periods of high demand. Additionally, or alternatively, rather than configuring the payload with a thermal processing capability to process thermal energy at a rate that is continually generated by the payload at the capacity supporting the peak demand, the payload may be configured with a smaller thermal processing capability, and the satellite may be configured with a thermal management component that stores excess thermal energy generated by the payload during periods of high demand.

For example, a payload may be configured to utilize electrical energy at a first rate (or peak rate) during a period of a demand profile that is associated with a high level of demand and at a second rate (or "off-peak" rate) during a period of the demand profile that is associated with a lower level of demand. While utilizing electrical energy at the peak rate, an energy generation system that is coupled with the payload may generate electrical energy at a rate that is less than the peak rate, and an energy storage component (or a combination of the energy generation system and the energy storage component) may supply the energy at the peak rate to the payload. While utilizing electrical energy at the off-peak rate, the energy generation system may generate electrical energy at a rate that is greater than the off-peak rate, charging the energy storage component. Thus, by modulating a capacity of a payload based on a demand profile, a payload may be configured with a smaller power system than if the payload were to have a capacity that constantly supports a peak demand.

Also, by modulating a capacity of a payload based on a demand profile, a thermal processing capability of the payload may be decreased relative to if the payload had a constant capacity that supports a peak demand. That is, though the payload may generate thermal energy at a rate that exceeds a thermal processing capability of the payload while utilizing electrical energy at the peak rate, the payload may dissipate the excess thermal energy while the payload utilizes electrical energy at the off-peak rate. To dampen an effect of the excess thermal energy and/or prevent the payload from overheating when the payload utilizes electrical energy at the peak rate, a thermal management component may be coupled with the payload and used to process (e.g., absorb and dissipate) the excess thermal energy. The thermal management component may include a medium that transitions from one phase (e.g., a solid) to another phase (e.g., a liquid) based on absorbing thermal energy. A temperature of the payload may remain constant (or nearly constant) while the medium transitions between the phases.

This description provides various examples of techniques for modulating a capacity of a satellite, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1 shows a diagram of a communications system that supports modulating a capacity of a satellite in accordance with examples as disclosed herein. Communications system 100 may use a number of network architectures including a space segment 101 and ground segment 102. The space segment 101 may include one or more satellites 120. The ground segment 102 may include one or more access node terminals 130 (e.g., gateway terminals, ground stations), as well as network devices 141 such as network operations centers (NOCs) or other central processing centers or devices, and satellite and gateway terminal command centers. In some examples, the ground segment 102 may also include user terminals 150 that are provided a communications service via a satellite 120.

User terminals 150 may include various devices configured to communicate signals with the satellite 120, which may include fixed terminals (e.g., ground-based stationary terminals) or mobile terminals such as terminals on boats, aircraft, ground-based vehicles, and the like. A user terminal 150 may communicate data and information with an access node terminal 130 via the satellite 120. The data and information may be communicated with a destination device such as a network device 141, or some other device or distributed server associated with a network 140.

An access node terminal 130 may transmit forward uplink signals 132 to satellite 120 and receive return downlink signals 133 from satellite 120. Access node terminals 130 may also be known as ground stations, gateways, gateway terminals, or hubs. An access node terminal 130 may include an access node terminal antenna system 131 and an access node transceiver 135. The access node terminal antenna system 131 may be two-way capable and designed with adequate transmit power and receive sensitivity to communicate reliably with the satellite 120. In some examples, access node terminal antenna system 131 may comprise a parabolic reflector with high directivity in the direction of a satellite 120 and low directivity in other directions. Access node terminal antenna system 131 may comprise a variety of alternative configurations and include operating features such as high isolation between orthogonal polarizations, high efficiency in the operational frequency bands, low noise, and the like.

When supporting a communications service, an access node terminal 130 may schedule traffic to user terminals 150. Alternatively, such scheduling may be performed in other parts of a communications system 100 (e.g., at one or more network devices 141, which may include network operations centers (NOC) and/or gateway command centers). Although one access node terminal 130 is shown in FIG. 1, examples in accordance with the present disclosure may be implemented in communications systems having a plurality of access node terminals 130, each of which may be coupled to each other and/or one or more networks 140.

An access node terminal 130 may provide an interface between the network 140 and the satellite 120 and, in some examples, may be configured to receive data and information directed between the network 140 and one or more user terminals 150. Access node terminal 130 may format the data and information for delivery to respective user terminals 150. Similarly, access node terminal 130 may be configured to receive signals from the satellite 120 (e.g., from one or more user terminals 150) directed to a destination accessible via network 140. Access node terminal 130 may also format the received signals for transmission on network 140.

The network(s) 140 may be any type of network and can include, for example, the Internet, an internet protocol (IP) network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the access node terminal 130 with other access node terminals that may be in communication with the same satellite 120 or with different satellites 120 or other vehicles.

One or more network device(s) 141 may be coupled with the access node terminal 130 and may control aspects of the communications system 100. In various examples a network device 141 may be co-located or otherwise nearby the access node terminal 130 or may be a remote installation that communicates with the access node terminal 130 and/or network(s) 140 via wired and/or wireless communications link(s).

A satellite 120 may be configured to support wireless communications between one or more access node terminals 130 and/or various user terminals 150 located in a service coverage area. In some examples, the satellite 120 may be deployed in a geostationary orbit, such that its orbital position with respect to terrestrial devices is relatively fixed or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

When supporting a communications service, the satellite 120 may receive forward uplink signals 132 from one or more access node terminals 130 and provide corresponding forward downlink signals 172 to one or more user terminals 150. The satellite 120 may also receive return uplink signals 173 from one or more user terminals 150 and provide corresponding return downlink signals 133 to one or more access node terminals 130. A variety of physical layer transmission modulation and coding techniques may be used by access node terminals 130, satellite 120, and user terminals 150 for the communication of signals (e.g., adaptive coding and modulation (ACM)). A satellite 120 may include one or more transponders that may each be coupled with one or more receive elements and one or more transmit elements of an antenna, forming K receive/transmit paths having different radiation patterns (e.g., by using different frequency range and polarization combinations). Each of the K receive/transmit paths may be allocated as a forward pathway or a return pathway at any instant of time. The transponders may be used to perform signal processing, such as amplification, frequency conversion, beamforming, and the like.

The satellite 120 may include an antenna assembly 121 having one or more antenna feed elements. Each of the antenna feed elements may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the antenna feed elements may also include, or be otherwise coupled with, a radio frequency (RF) signal transducer, a low noise amplifier (LNA), or power amplifier (PA), and may be coupled with one or more transponders in the satellite 120.

The satellite 120 may communicate with an access node terminal 130 by transmitting return downlink signals 133 and/or receiving forward uplink signals 132 via one or more access node beams (e.g., access node beam 125-*b*, which may be associated with a respective access node beam coverage area 126-*b*). Access node beam 125-*b* may, for example, support a communications service for one or more user terminals 150 (e.g., relayed by the satellite 120), or any other communications between the satellite 120 and the access node terminal 130.

The satellite 120 may communicate with a user terminal 150 by transmitting forward downlink signals 172 and/or receiving return uplink signals 173 via one or more user beams (e.g., user beam 125-*a*, which may be associated with a respective user beam coverage area 126-*a*). User beam 125-*a* may support a communications service for one or more user terminals 150 or any other communications between the satellite 120 and the user terminal 150. In some examples, the satellite may also relay communications from an access node terminal 130 to user terminals 150 using the access node beam 125-*a* and the access node beam 125-*b* (e.g., access node terminals 130 and user terminals 150 may share a beam).

In other examples, a satellite 120 may communicate data using multiple beams that cover a service area of the satellite 120—e.g., to increase a capacity of a communications system. That is, the satellite 120 may communicate data using multiple beams that are arrayed or tiled to cover a service area of the satellite 120. Some communications satellites 120 may include several transponders, each able to independently receive and transmit signals. Each transponder is coupled to antenna elements (e.g., a receive element and a transmit element) to form a receive/transmit signal path that has a different radiation pattern (antenna pattern) from the other receive/transmit signal paths to create unique beams that may be allocated to the same (e.g., using different frequency ranges or polarizations) or different beam coverage areas. In some cases, a single receive/transmit signal path may be shared across multiple beams using input and/or output multiplexers. In such cases, the number of simultaneous beams that may be formed may generally be limited by the number of receive/transmit signal paths deployed on the satellite. In some embodiments, a Multi-Frequency Time-Division Multiple Access (MF-TDMA) scheme may be used for forward uplink signals 132 and return uplink signals 173, allowing efficient streaming of traffic while maintaining flexibility in allocating capacity among user terminals 150. In these embodiments, a number of frequency channels may be allocated in a fixed manner or, alternatively, may be allocated in a dynamic fashion. A Time Division Multiple Access (TDMA) scheme may also be employed in each frequency channel. In this scheme, each frequency channel may be divided into several timeslots that can be assigned to a connection (e.g., to a particular user terminal 150). In other embodiments, one or more of the forward uplink signals 132 and return uplink signals 173 may be configured using other schemes, such as Frequency Division Multiple Access (FDMA), Orthogonal Frequency Division Multiple Access (OFDMA), Code Division Multiple Access (CDMA), or any number of hybrid or other schemes known in the art. In various embodiments, physical layer techniques may be the same for each of the signals 132, 133, 172, or 173, or some of the signals may use different physical layer techniques than other signals.

User beams 125-*a* or access node beams 125-*b* may also be obtained via beamforming. Beamforming for a communication link may be performed by adjusting the signal phase (or time delay), and sometimes signal amplitude, of signals transmitted and/or received by multiple elements of one or more antenna arrays. This phase/amplitude adjustment is commonly referred to as applying "beam weights" or "beam coefficients" to the transmitted signals. For reception (by receive elements of the one or more antenna arrays), the relative phases, and sometimes amplitudes, of the received signals are adjusted (e.g., the same or different beam weights are applied) so that the energy received from a desired location by multiple receive antenna elements will constructively superpose. To support beamforming operations, the satellite 120 may use a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). Relatively large reflectors may be illuminated by a phased array of antenna feed elements, supporting an ability to make various patterns of spot beams within the constraints set by the size of the reflector and the number and placement of the antenna feed elements.

Each of the antenna feed elements may also include, or be otherwise coupled with an RF signal transducer, an LNA, or PA, and may be coupled with one or more transponders in the satellite 120 that may perform other signal processing such as frequency conversion, beamforming processing, and the like. A transponder that is coupled with multiple antenna feed elements may be capable of performing beamformed communications. Phased array fed reflectors may be employed for both receiving uplink signals (e.g., forward uplink signal 132, return uplink signal 173, or both) and transmitting downlink signals (e.g., return downlink signal 133, forward downlink signal 172, or both). In some examples, some or all antenna feed elements may be arranged as an array of constituent receive and/or transmit antenna feed elements that cooperate to enable various examples of beamforming, such as ground-based beamforming (GBBF), on-board beamforming (OBBF), end-to-end beamforming, or other types of beamforming.

A satellite 120 may be configured with a payload and a power system that supports the operation of the payload. The payload may be a device that provides a satellite-based service to one or more users (or subscribers), such as a communication service, a geolocation service, an imagery service, or any combination thereof. A payload may be capable of communicating information for a service at a maximum data rate—for example, the maximum data rate may support communicating with a certain quantity of users at a baseline data rate. The maximum data rate supported by a payload may be referred to as the capacity of the payload, and may depend on available communication resources (e.g., time, frequency, and spatial resources) and power (e.g., equivalent isotropically radiated power (EIRP)). In some cases, a capacity of a payload may remain constant throughout an operating life of the payload—e.g., the payload may activate enough components to continuously support communicating at the maximum data rate. For example, for a communications payload, a quantity of communications that are supported by the set of available communication resources may remain constant. The communications payload that may also be configured with and activate a sufficient quantity of communications elements (e.g., amplifiers, antennas, transponders, and other signal processing components) to ensure that data may be provided at the predetermined data rate.

By configuring a payload to have a constant capacity, an operator may ensure that a communications payload is capable of continuously and simultaneously providing a service at a maximum data rate. Such payloads may thus maintain a constant capacity as a demand for the service changes. In some cases, the demand for a service is cyclical and may be represented by a demand profile that shows a change in demand over a proscribed period (e.g., over 24 hours, or a duration of one or more orbits of the satellite such as a LEO or MEO satellite). For example, a communications payload may support a same quantity of communications over a same quantity of communications resources as a demand for the communication service transitions between periods of low and high demand. Thus, during the periods of low demand, the payload may have excess capacity that goes unused—that is, the payload may be capable of communicating larger amount of data and/or servicing additional users that are not present. And during the periods of high demand, all of the capacity of the payload may be used—that is, the payload may not be capable of communicating larger amount of data and/or servicing additional users that are requesting services. Accordingly, during periods of high demand, additional users that are requesting access to the communications service and/or current users that are requesting higher data rates may be unable to access the communication service provided by the payload. Also, a communications payload may continuously consume (e.g., at all times) electrical energy at a rate that supports meeting a highest anticipated level of demand. That is, the communications payload may consume a constant amount of electrical power (e.g., ~20 KW).

The power system may generate electrical energy and provide the electrical energy to the payload. The power system may include an energy generation device (e.g., a solar array or nuclear generator) and an energy storage device (e.g., a battery). The energy storage device, or a combination of the energy storage device and the energy generation device, may supply electrical energy to the payload. In some cases, an energy generating capability of the power system (which may also be referred to as a size or capacity of the power system) may be configured based on a rate at which electrical energy is consumed by the payload (e.g., over a period of time). That is, the power system may be configured to generate electrical energy at a rate that matches a rate at which electrical energy is consumed by the payload during operation. Thus, a satellite 120 that includes a payload having a constant capacity (e.g., a communications payload), may also include a power system that is configured to provide an electrical energy at a rate that matches a rate at which electrical energy is consumed by the payload to meet a highest anticipated level of demand.

In addition to consuming electrical energy at a rate that supports meeting a highest anticipated level of demand, a payload that has a constant capacity may also continuously generate thermal energy at a rate associated with meeting the highest anticipated level of demand. That is, a payload having a constant capacity (e.g., a communication payload) may generate thermal energy at a first rate (e.g., ~10 KW). Thus, the payload may also be configured to have a thermal processing capability that is sufficient to process (e.g., absorb and dissipate) the thermal energy generated by the payload during operation without overheating the payload. That is, the payload may be configured so that a rate at which thermal energy is generated by the payload is equivalent to or less than a rate at which thermal energy is dissipated by the payload. In a steady state condition, the rate at which thermal energy is generated by the payload may be equivalent to a rate at which thermal energy is dissipated by the payload, and a temperature of the payload may remain constant (or nearly constant). In some cases, the data rate provided by a satellite having a constant capacity may be limited by the available power (e.g., power-limited), or the ability to dissipate thermal energy (e.g., thermally-limited).

But configuring a payload to operate with a constant capacity may result in the payload having excess capacity during periods of low demand. That is, during periods of low demand, the payload may communicate data at a data rate that is less than a maximum data rate, despite the payload currently being configured to communicate at up to the maximum data rate. Thus, a rate at which electrical energy is consumed (and an amount of electrical energy that is consumed) by the payload may be excessive during periods of low demand. Also, a rate at which thermal energy is generated (and an amount of thermal energy generated) by the payload may be excessive during periods of low demand. Additionally, configuring a payload to operate with a constant capacity may result in the payload having insufficient capacity during periods of high demand—e.g., if the demand is higher than expected or exceeds the capacity of the payload.

According to aspects described herein, a payload may be configured to modulate its capacity based on a demand profile that represents a demand for a service provided by the payload. For example, the payload may provide a first level of capacity when a demand profile indicates that demand may be above a threshold and a second, smaller level of capacity when the demand profile indicates that demand may be below a threshold. The payload may be capable of providing additional levels of capacity. Additionally, rather than configuring the payload with a power system that supports providing electrical energy at a rate that is sufficient to continuously operate the payload at a capacity supporting an anticipated peak demand, the payload may be configured with a smaller power system that provides electrical energy at a rate that is based on an average power consumption of the payload. In such cases, energy stored in an energy storage system may be used to meet the electrical energy demands of the payload during periods of high demand. Additionally, or alternatively, rather than configuring the payload with a thermal processing capability to process thermal energy at a rate that is continually generated by the payload at the capacity supporting the peak demand, the payload may be configured with a smaller thermal processing capability, and a satellite 120 may be configured with a thermal management component that stores excess thermal energy generated by the payload during periods of high demand.

For example, a payload may be configured to utilize electrical energy at a first rate (or peak rate) during a period of a demand profile that is associated with a high level of demand and at a second rate (or "off-peak" rate) during a period of the demand profile that is associated with a lower level of demand. While utilizing electrical energy at the peak rate, an energy generation system that is coupled with the payload may generate electrical energy at a rate that is less than the peak rate, and an energy storage component (or a combination of the energy generation system and the energy storage component) may supply the energy at the peak rate to the payload. While utilizing electrical energy at the off-peak rate, the energy generation system may generate electrical energy at a rate that is greater than the off-peak rate, charging the energy storage component. Thus, by modulating a capacity of a payload based on a demand profile, a payload may be configured with a smaller power system than if the payload were to have a capacity that constantly supports a peak demand.

Also, by modulating a capacity of a payload based on a demand profile, a thermal processing capability of the payload may be decreased relative to if the payload had a constant capacity that supports a peak demand. That is, though the payload may generate thermal energy at a rate that exceeds a thermal processing capability of the payload while utilizing electrical energy at the peak rate, the payload may dissipate the excess thermal energy while the payload utilizes electrical energy at the off-peak rate. To dampen an effect of the excess thermal energy and/or prevent the payload from overheating when the payload utilizes electrical energy at the peak rate, a thermal management component may be coupled with the payload and used to process (e.g., absorb and dissipate) the excess thermal energy. The thermal management component may include a medium that transitions from one phase to another phase based on absorbing thermal energy.

Figure 2:
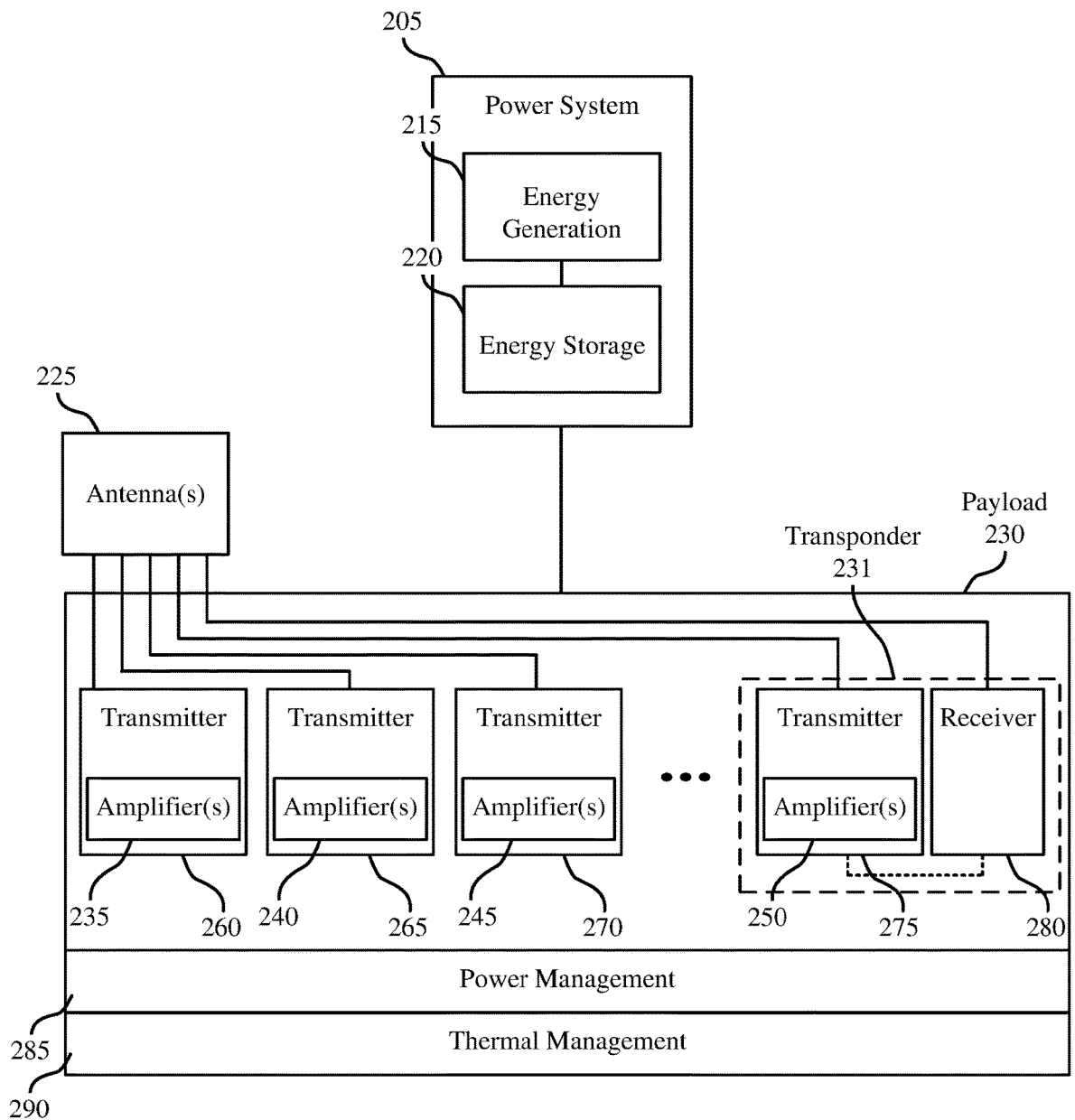
FIG. 2 shows a diagram of a satellite that supports modulating a capacity of a satellite in accordance with examples as disclosed herein.

FIG. 2 shows a diagram of a satellite that supports modulating a capacity of a satellite in accordance with examples as disclosed herein. Satellite 200 may include power system 205, antenna 225, payload 230, power management system 285, and thermal management system 290. Satellite 200 may be an example of a satellite 120 as described with reference to FIG. 1.

Power system 205 may be configured to generate and supply electrical energy to payload 230. Power system 205 may include an energy generation component 215 and an energy storage component 220. Energy generation component 215 may be configured to generate electrical energy. Energy generation component 215 may include an array of solar cells or a nuclear generator. Energy storage component 220 may store electrical energy. Energy storage component 220 may be a battery. Energy generation component 215, energy storage component 220, or any combination thereof may be used to supply electrical energy to payload 230. In some examples, the energy generation component 215 may be configured to supply electrical energy to energy storage component 220 (that is, energy generation component 215 may be configured to charge energy storage component 220), and energy storage component 220 may be used to supply electrical energy to payload 230. In some examples, energy storage component 220 may be configured to supply electrical energy to payload 230 while energy generation component 215 is unable to generate electrical energy (e.g., during nighttime or an eclipse event).

Antenna 225 may be configured to transmit data to one or more user terminals. Antenna 225 may include one or more antenna elements. Each antenna element may be associated with a feed and referred to as an antenna feed element. Antenna 225 may support the transmission of a single beam using each feed, where each beam uses a range of frequency resources (or a frequency channel). In other cases, antenna 225 may support the transmission of one or more beams where each beam may be formed from signals transmitted from multiple antenna feed elements. In such cases, antenna 225 may include a phased array of antenna feed elements. Antenna 225 may be an example of, or included in, an antenna assembly 121, as described with reference to FIG. 1.

Payload 230 may be configured to provide a satellite-based service, such as a communication service, an imagery service, or a geolocation service. Payload 230 may include one or more transmitters, including first transmitter 260, second transmitter 265, third transmitter 270, and nth transmitter 275. Each transmitter may be coupled with an antenna feed element of antenna 225, one or more amplifiers that are configured to amplify a communication signal, and one or more transponders. First transmitter 260 through nth transmitter 275 may include, or be otherwise coupled with, first amplifier 235 through nth amplifier 250, respectively.

In some examples, each of the amplifiers may be configurable ("on-the-fly") to operate using electrical energy at a first rate or a second, smaller rate. The first rate may be referred to as a peak rate and the second rate may be referred to as an off-peak rate. In some examples, the amplifiers may be partitioned into a first set of amplifiers (which may include first amplifier 235 and third amplifier 245) and a second set of amplifiers (which may include second amplifier 240 and nth amplifier 250). Payload 230 may be configurable to use both the first set of amplifiers and the second set of amplifiers. Or payload 230 may be configured to use one of the first set of amplifiers and the second set of amplifiers. In some cases, the first set of amplifiers may operate using electrical energy at a peak rate and the second set of amplifiers may operate using electrical energy at a second, smaller rate, and the transmitter may be configured to use one of the first or second set of amplifiers for signal transmission. In other examples, the first set of amplifiers and the second set of amplifiers may consume electrical energy at a same rate, and the transmitter may be configured to use one or both of the first or second set of amplifiers for signal transmission.

In some cases, each transmitter may be coupled with or a part of one or more transponders 231 located within payload 230. A transponder may be configured to receive a communication from an access node terminal and transmit the communication to a user terminal that is within a coverage area of satellite 200—that is, the transponder may be configured to relay communications between an access node terminal and user terminal. For example, first transponder 231 may include nth transmitter 275 and receiver 280, which may be coupled with nth transmitter 275. Before relaying a received signal to a user terminal or access node terminal, the transponder may modify the received signal. In some examples, the transponder modifies a received signal by shifting a frequency of the signal, amplifying the signal, polarizing the signal, or any combination thereof. In other examples, the transponder 231 transmits the received signal using a beam selected from multiple beams formed by payload 230—e.g., by transmitting the signal over one or more transmitters and antenna feed elements in accordance with a weight vector.

In some cases, payload 230 may include a first set of transponders (e.g., including first transponder 231) that are used to form a first set of transmission beams that cover a geographic area. In some cases, payload 230 may also include a second set of transponders (e.g., including first transponder 231 and additional transponders not in the first set of transponders) that are used to form a second set of transmission beams that cover the geographic area. Payload 230 may be configurable to use both the first set of transponders and the second set of transponders, resulting in payload 230 transmitting an increased quantity of transmission beams. Payload 230 may be configurable to use both the first set of transponders and the second set of transponders, resulting in payload 230 transmitting a same quantity of transmission beams that are transmitted with better signal characteristics (e.g., higher power). Or payload 230 may be configured to use one of the first set of transponders and the second set of transponders, where the second set of transponders may be used to form an increased quantity of transmission beams relative to the first set of transponders. Although generally discussed in the context of transmitting, the transponders may similarly be coupled with receivers that may be coupled with antenna 225 or a different antenna.

The characteristics of the transmitters in the transponders is described because transmitters often consume substantially more power than receivers, and thus contribute more substantially to the power consumed and thermal energy generated by payload 230. It should be understood that similar considerations may be made based on receivers (e.g., for forward uplink signals and return uplink signals).

Power management system 285 may be configured to modulate a rate at which electrical energy is consumed by payload 230 based on a demand profile that indicates a level of demand for communication services provided by payload 230 over a period of time. The demand profile may have a first interval during which time the demand for the communication services exceeds (or is expected to exceed) a threshold (e.g., between 4:00 PM and 7:00 PM), and a second interval during which time the demand for the communication services is below (or is expected to be below) a threshold (e.g., between 10:00 AM and 3:59 PM). In some cases, the demand interval also has a third interval during which time the demand for the communication services exceeds (or is expected to exceed) a threshold (e.g., between 8:00 AM and 9:59 AM), and a fourth interval during which time the demand for the communication services is below (or is expected to be below) a threshold (e.g., between 8:00 PM and 7:59 AM).

Power management system 285 may configure payload 230 in a first mode in which electrical energy is consumed at a peak rate when the demand level indicated by the demand profile is above a threshold (e.g., during the first interval) and a second mode in which electrical energy is consumed at a second, smaller rate when the demand level indicated by the demand profile is below the threshold (e.g., during the second interval). The first mode may be referred to as a "high-power mode" and the second mode may be referred to as a "low-power mode." That is, payload 230 may consume a first amount of power when the demand level indicated by the demand profile is above a threshold and a second, smaller amount of power when the demand level indicated by the demand profile is below the threshold. In some cases, the peak rate may be a first average rate and the second rate may be a second average rate. In some cases, the peak rate may include a first range of rates and the second rate may include a second range of rates.

While operating in the high-power mode, payload 230 may change an operation of one or more components and/or activate one or more components that are otherwise deactivated when the low-power mode is configured. For example, when operating in the high-power mode, payload 230 may configure each of first amplifier 235 through nth amplifier 250 to consume electrical energy at a peak rate that is higher than an off-peak rate at which first amplifier 235 through nth amplifier 250 consume electrical energy when the low-power mode is configured. In another example, first amplifier 235 through nth amplifier 250 may include a first set of amplifiers and set second of amplifiers that consume electrical energy at a lower rate (e.g., that consume less power) than the first set of amplifiers. Payload 230 may activate the first set of amplifiers when the high-power mode is configured and the second set of amplifiers when the low-power mode is configured. In another example, first amplifier 235 through nth amplifier 250 may include a first set of amplifiers and set second of amplifiers that consume electrical energy at a same rate. Payload 230 may activate both the first set of amplifiers and the second set of amplifiers when the high-power mode is configured and may deactivate the first set of amplifiers or the second set of amplifiers when the low-power mode is configured.

In another example, payload 230 may activate a set of amplifiers, including the first amplifier 235 through nth amplifier 250 when operating in the high-power mode, where a subset of the set of amplifiers may be deactivated when the low-power mode is configured (e.g., second amplifier 240 and nth amplifier 250). Additionally, or alternatively, payload 230 may activate a set of transponders that are associated with the activated set of amplifiers when operating in the high-power mode, where a subset of the set of transponders may be deactivated when the low-power mode is configured. In some examples, a first set of transponders including a first set of amplifiers may use a different set of frequency resources than a second set of transponders including a second set of amplifiers. In some examples, the first set of transponders may be associated with a different polarization relative to corresponding transponders of the second set of transponders. In some examples, the first set of transponders may enable payload 230 to beamform transmissions or may be used with the second set of transponders to increase a quantity of beams transmitted from payload 230. By increasing an amplification ability of payload 230, a capacity of payload 230 may be increased—e.g., by enabling higher modulation and coding schemes to be used. Also, by increasing a quantity of transponders, a capacity of payload 230 may be increased—e.g., by enabling additional frequency or spatial resources, polarizations, beamforming, and/or enhanced beamforming to be used. Additional examples related to configuring a high-power mode are discussed herein and with reference to FIG. 5.

Thermal management system 290 may be configured to regulate a temperature of payload 230 and/or keep payload 230 from overheating when payload 230 operates in the high-power mode. That is, thermal management system 290 may be used to store thermal energy generated by payload 230 while operating in the high-power mode and to dissipate the stored thermal energy when payload 230 operates in the low-power mode. Thermal management system 290 may include a pumped-fluid system that absorbs and redistributes thermal energy throughout payload 230 and thermal management system 290. Additionally, or alternatively, thermal management system 290 may include a medium that transitions from a first phase (e.g., a solid phase) to a second phase (e.g., a liquid phase) when payload 230 operates in the high-power mode based on absorbing more thermal energy than is dissipated. The medium may include a phase change material (e.g., a wax, or wax-like substance with a high enthalpy). The medium may transition from the second phase back to the first phase when payload 230 operates in the low-power mode based on dissipating more thermal energy than absorbed (e.g., thermal management system 290 may dissipate more energy than is generated by payload 230). While transitioning from the first phase to the second phase, and vice versa, a temperature of the phase change material (and thus payload 230) may remain relatively constant. This temperature may be referred to as the transition temperature. In some examples, the transition temperature of the phase change material may be based on an operating temperature range for payload 230—e.g., the transition temperature may be selected to be near the middle or at a desired point of the operating temperature range.

Figure 3:
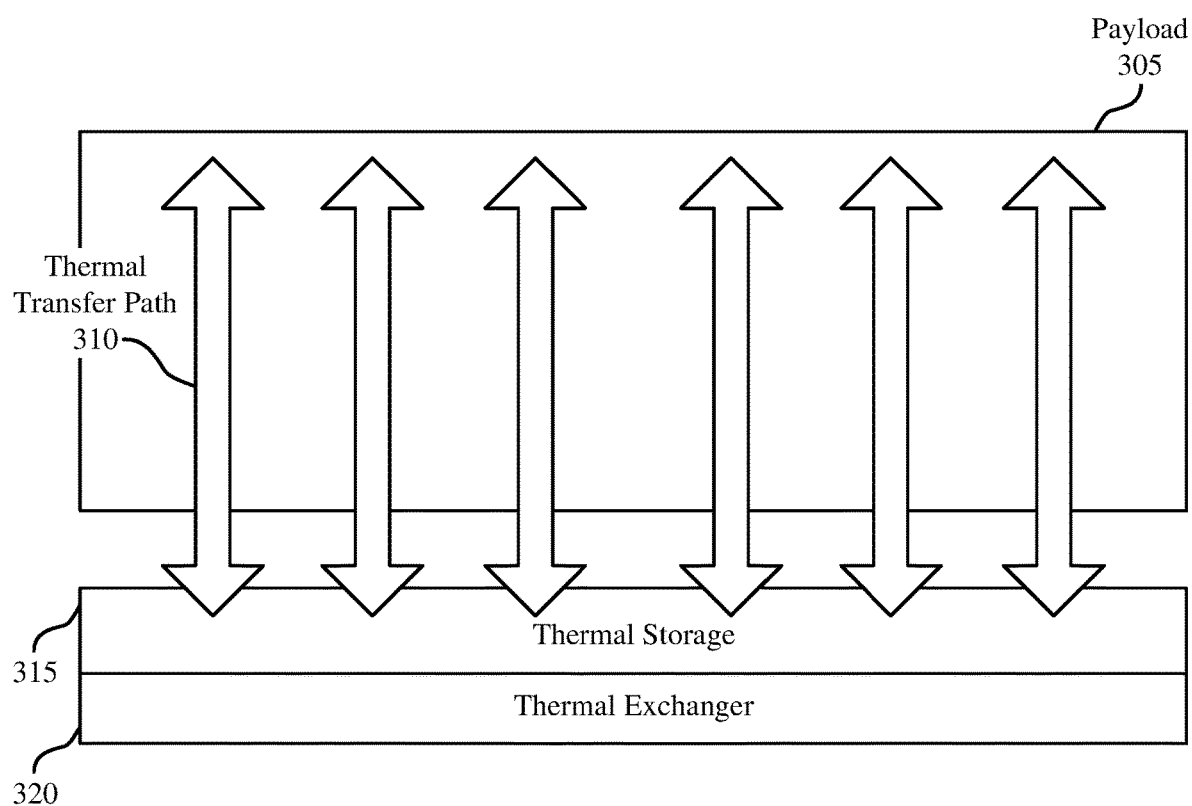
FIG. 3 shows a diagram of a satellite that supports modulating a capacity of a satellite in accordance with examples as disclosed herein.

FIG. 3 shows a diagram of a satellite that supports modulating a capacity of a satellite in accordance with examples as disclosed herein. Satellite 300 may include payload 305, thermal transfer path 310, thermal storage element 315, and thermal exchanger 320. Satellite 300 may be an example of a satellite as described with reference to FIGS. 1 and 2. Payload 305 may be an example of a payload 230 as describe with reference to FIG. 2.

Thermal transfer path 310 may represent a path between payload 305 and thermal storage element 315 over which thermal is transferred. Thermal transfer path 310 may be, or include, a physical path between payload 305 and thermal storage element 315. For example, thermal transfer path 310 may follow a fluid loop or a thermally conductive trace that thermally couples payload 305 to thermal storage element 315. Additionally, or alternatively, thermal transfer path 310 may be, or include, an indirect path between payload 305 and thermal storage element 315. For example, thermal transfer path 310 may follow an arbitrary path (e.g., via one or more other components) that thermally couples payload 305 to thermal storage element 315.

Thermal storage element 315 may be configured to store excess thermal energy generated by payload 305 while payload 305 operates in a high-power mode, as described herein. Thermal storage element 315 may include aspects of pumped fluid system. The pumped fluid system may include a fluid reservoir and conduits that are distributed across payload 305 (e.g., in a snaked manner). Additionally, or alternatively, thermal storage element 315 may include a medium that transitions between phases while payload 305 operates in the high-power mode. An example medium includes a wax or substance with a high enthalpy. The phase-change medium may be thermally coupled with payload 305 via the thermal transfer path 310. In some cases, thermal storage element 315 may be in direct contact with (e.g., touching) payload 305. Thermal storage element 315 may be included in thermal management system 290.

Thermal exchanger 320 may be configured to dissipate, or assist in the dissipation of, thermal energy stored in thermal storage element 315. Thermal exchanger 320 may include a thermally conductive material that is exposed to an external environment. In some examples, thermal exchanger 320 may be a block of thermally conductive material that is exposed to space. In some cases, thermal exchanger 320 may include thermally conductive fins that increase a surface area of thermal exchanger 320 that is exposed to space. In some examples, if thermal storage element 315 uses a pumped fluid system, the liquid may be pumped through thermally conductive conduits that are exposed to space. Thermal exchanger 320 may be included in thermal management system 290.

Figure 4A:
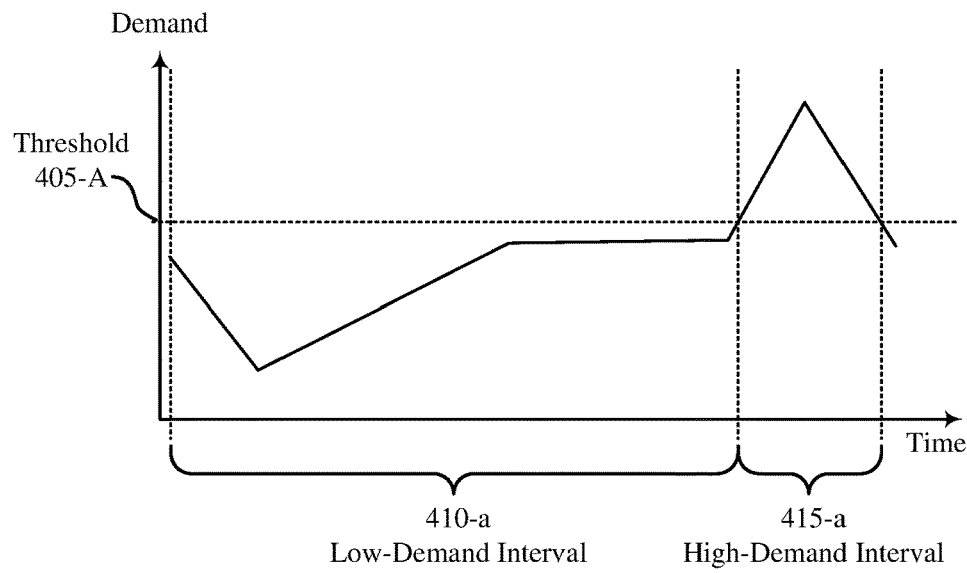
FIG. 4A shows a diagram of a demand profile that supports modulating a capacity of a satellite in accordance with examples as disclosed herein.

FIG. 4A shows a diagram of a demand profile that supports modulating a capacity of a satellite in accordance with examples as disclosed herein. Demand profile 400-$a$ depicts a level of demand for a service (e.g., a communications service) provided by a payload over a period of time. Demand profile 400-$a$ also depicts demand threshold 405-$a$, low-demand interval 410-$a$, and high-demand interval 415-$a$.

Demand threshold 405-$a$ may be selected to distinguish between periods of low-demand and high-demand for a service provided by a payload. A value for demand threshold 405-$a$ may be selected based on an energy storage capacity of the payload—e.g., demand threshold 405-$a$ may have a higher value if the energy storage capacity of the payload is smaller than another payload. Additionally, or alternatively, a value for demand threshold 405-$a$ may be selected based on an amount of electrical energy stored by an energy storage component of the payload—e.g., the demand threshold 405-$a$ may have a higher value if the energy storage capacity is significantly discharge prior to a high-demand interval.

Low-demand interval 410-$a$ may be associated with a period during which time a level of demand (or expected level of demand) for a service provided by the payload is below demand threshold 405-$a$. High-demand interval 415-$a$ may be associated with a period during which time a level of demand (or expected level of demand) for a service provided by the payload is above demand threshold 405-$a$.

During low-demand interval 410-$a$, the payload may operate in a low-power mode, and during high-demand interval 415-$a$, the payload may operate in a high-power mode, as described herein and with reference to FIG. 2. Thus, a capacity of the payload may be reduced during low-demand interval 410-$a$ relative to a capacity of the payload during high-demand interval 415-$a$. That is, the payload may be capable of communicating larger amounts of data during high-demand interval 415-$a$ relative to low-demand interval 410-$a$. The payload may also consume electrical energy and generate thermal energy at a higher rate during high-demand interval 415-$a$ relative to low-demand interval 410-$a$. A thermal management system at the payload may store excess thermal energy generated by the payload during high-demand interval 415-$a$ and may dissipate thermal energy stored at the thermal management system during low-demand interval 410-$a$.

Therefore, the payload may be capable of servicing users at a lower power (providing a lower data rate) while demand for a service provided by the payload is low and servicing users at a higher power (providing a higher data rate) when the demand is high. By contrast, a payload that has a fixed capacity (e.g., that continuously supports a maximum data rate) may be capable of supporting a higher data rate when the demand is low and incapable of supporting a peak data rate when demand is high—e.g., if the fixed capacity of the payload is outmatched by the demand.

In some examples, the value for demand threshold 405-$a$, and thus, the lengths of low-demand interval 410-$a$ and high-demand interval 415-$a$, may be selected based on an electrical energy generation and storage capability of the payload. For example, demand threshold 405-$a$ may be selected so that an average amount of electrical energy consumed by the payload across low-demand interval 410-$a$ and high-demand interval 415-$a$ matches an average of a rate of generation of electrical energy for the satellite. Also, demand threshold 405-$a$ may be selected so that an amount of electrical energy consumed during high-demand interval 415-$a$ is less than a combined amount of electrical energy generated by the payload during high-demand interval 415-$a$ and an amount of electrical energy stored by an energy storage element prior to high-demand interval 415-$a$.

Figure 4B:
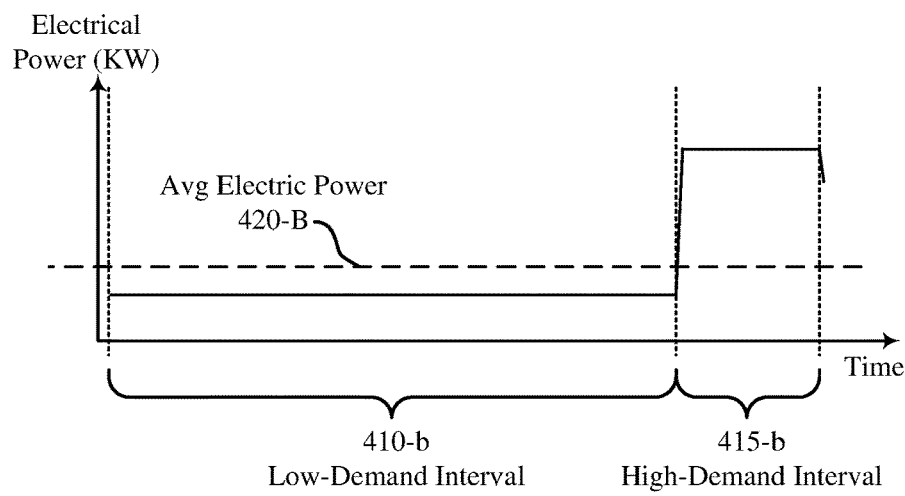
FIG. 4B shows a diagram of an electrical power profile that supports modulating a capacity of a satellite in accordance with examples as disclosed herein.

FIG. 4B shows a diagram of an electric power profile that supports modulating a capacity of a satellite in accordance with examples as disclosed herein. Electric power profile 401-$b$ depicts an amount of electrical power consumed by a payload over a period of time. Electric power profile 401-$b$ also depicts low-demand interval 410-$b$ and high-demand interval 415-$b$, which may correspond in time with low-demand interval 410-$a$ and high-demand interval 415-$a$ of FIG. 4A. Electric power profile 401-$b$ may also include average electrical power 420-$b$.

During low-demand interval 410-$b$, the payload may consume electrical power at a first rate (e.g., 5 KW). During high-demand interval 415-$b$, the payload may consume electrical power at a second rate (e.g., 20 KW). The average amount of electrical power (e.g., 8 KW) consumed by the payload (as represented by average electrical power 420-$b$) may be based on the power level of electrical consumption during low-demand interval 410-$b$, the power level of electrical consumption during high-demand interval 415-b, the length of low-demand interval 410-b, and the length of high-demand interval 415-b. In some cases, the level of electrical power generation (the electrical generation capability of a power system that supplies the payload) may be equivalent to or greater than the average electrical power 420-b consumed by the payload.

Figure 4C:
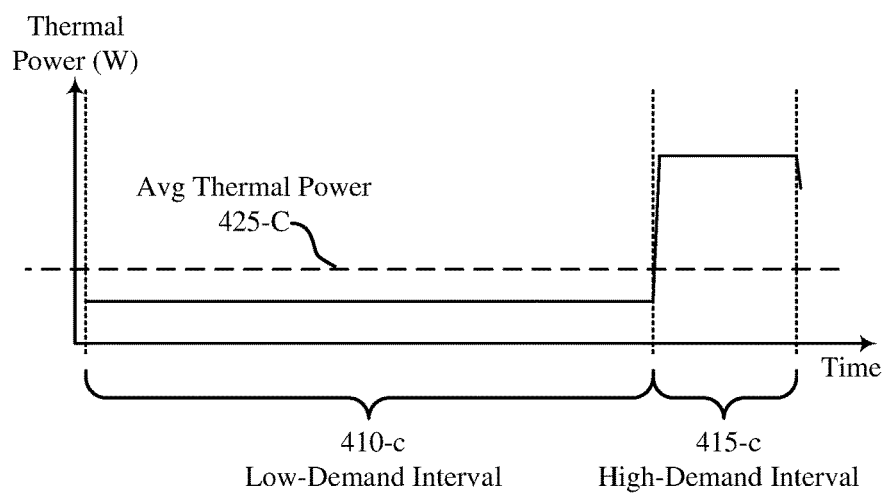
FIG. 4C shows a diagram of a thermal power profile that supports modulating a capacity of a satellite in accordance with examples as disclosed herein.

FIG. 4C shows a diagram of thermal power profile that supports modulating a capacity of a satellite in accordance with examples as disclosed herein. Thermal power profile 402-c depicts an amount of thermal power generated by a payload over a period of time. Thermal power profile 402-c also depicts low-demand interval 410-c and high-demand interval 415-c, which may correspond in time with low-demand interval 410-a, low-demand interval 410-b, high-demand interval 415-a, and high-demand interval 415-b of FIGS. 4A-4C. Thermal power profile 402-c may also include average thermal power 425-c.

During low-demand interval 410-c, the payload may generate thermal power at a first rate (e.g., 3 KW). During high-demand interval 415-c, the payload may generate thermal power at a second rate (e.g., 15 KW). The average amount of thermal power (e.g., 5 KW) generated by the payload (as represented by average thermal power 425-c) may be based on the level of thermal power generation during low-demand interval 410-c, the level of thermal power generation during high-demand interval 415-c, the length of low-demand interval 410-c, and the length of high-demand interval 415-c. In some cases, the thermal power level of dissipation (as dissipated by a thermal management system coupled with the payload) may be equivalent to or greater than the average thermal power 425-c generated by the payload.

Figure 5:
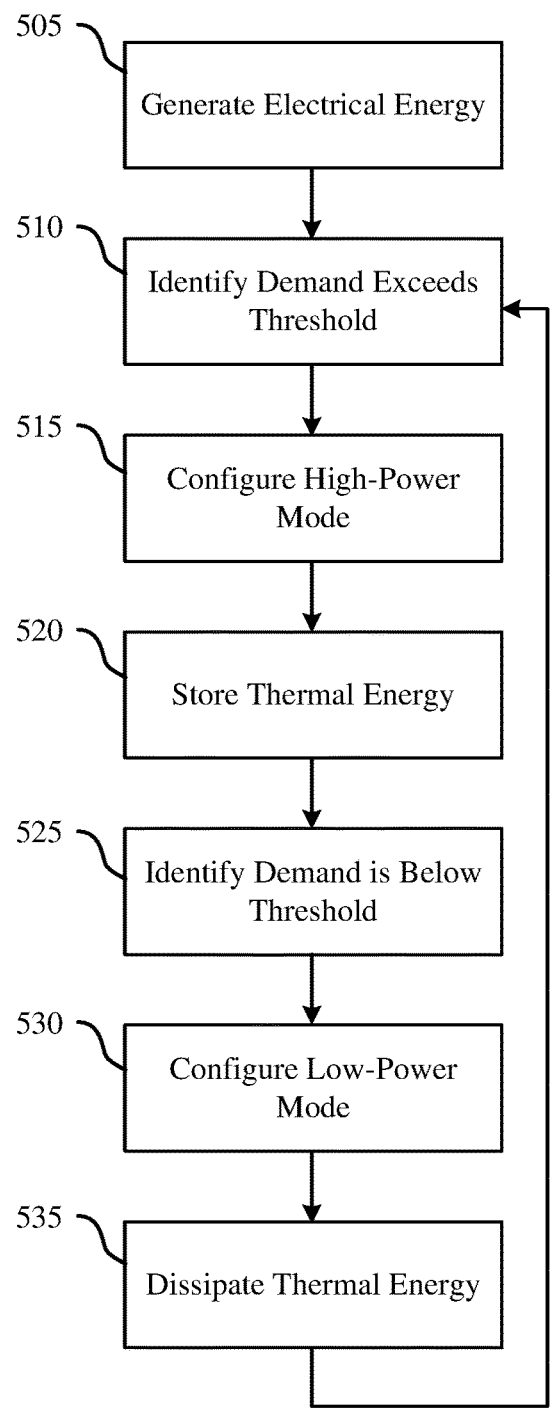
FIG. 5 shows a diagram of a process that supports modulating a capacity of a satellite in accordance with examples as disclosed herein.

FIG. 5 shows a diagram of a process that supports modulating a capacity of a satellite in accordance with examples as disclosed herein. Process flow 500 may be performed by a satellite as described with reference to FIGS. 1-3. One or more of the operations described in process flow 500 may be performed earlier or later in the process, omitted, replaced, supplemented, or any combination thereof. Also, additional operations described herein that are not included in process flow 500 may be included.

At block 505, a power system of the satellite may generate electrical energy at a first rate (or at a first power level). In some cases, the first rate may be an average rate over a time interval such as a day. For example, the power system may include a solar array, which may generate power depending on an amount of sunlight (e.g., higher during the day and lower or not generating power at night). The power system may supply the electrical energy to a payload of the satellite at a rate that is based on a rate at which electrical energy is being consumed (or drawn) by the payload. In some examples, the payload may be operating in a low-power mode and may be consuming electrical energy at a rate that is less than the rate at which electrical energy is being generated by the power system. Also, a thermal management system of the satellite may process (e.g., absorbing and/or dissipating) thermal energy based on a rate at which thermal energy is being generated by the payload. In some examples, the payload may be operating in a low-power mode, and the thermal management system may be dissipating electrical energy at a rate that is greater than the rate at which thermal energy is being generated by the payload.

At block 510, a power management system of the satellite may identify that a demand for a communications service provided by the payload exceeds a demand threshold. The power management system may identify that demand exceeds the demand threshold based on comparing a current (and/or future) level of demand indicated by a demand profile with the demand threshold. In some examples, the power management system of the satellite may identify that the demand has exceeded or is expected to exceed the demand threshold based on an indication from a ground station (e.g., from an access node 130 or network device 141).

At block 515, the payload may configure a high-power mode based on the level of demand exceeding (or being expected to exceed) the demand threshold. In some examples, the power management system sends an indication to the payload indicating that the level of demand has exceeded the demand threshold. In some examples, the payload may activate additional components (e.g., amplifiers or transponders) or modify a configuration of active components to operate in a mode that uses an increased amount of power, as described herein and with reference to FIG. 2. Thus, the payload may consume electrical energy at a rate that exceeds the rate at which the power system is generating electrical energy. And an energy storage element may be used to supply the excess electrical energy, reducing an amount of energy stored by the energy storage element. Also, the payload may generate thermal energy at a rate that exceeds the rate at which the thermal management system is dissipating electrical energy.

In some examples, the payload may support multiple beams, each corresponding to a separate transponder. The payload may include a first set of transponders corresponding to a first set of user beams and a second set of transponders corresponding to a second set of user beams. While operating in the low-power mode, the first set of transponders may be used to receive a first set of forward uplink signals from access node terminals and transmit respective forward downlink signals for the first set of user beams. While operating in a high-power mode, the second set of transponders may be activated, and the payload may receive a second set of forward uplink signals and transmit respective forward downlink signals for the second set of user beams. In some examples, the second set of transponders may be used in the high-power mode and the first set of transponders may be deactivated. In this case, the second set of transponders may, for example, correspond to a greater quantity of more highly directional (e.g., smaller) user beams also providing coverage to a same aggregate coverage area as the first set user beams. In other examples, the second set of transponders may be used in addition to the first set of transponders in the high-power mode. In this case, the coverage areas associated with the second set of user beams may be overlayed over the coverage areas of the first set of user beams and provide, for example, more targeted coverage within the aggregate coverage area of the first set of user beams. In some examples, the transponders may be configured for dynamic beam switching. The first set of transponders may correspond to a first quantity of active transponders and the second set of transponders may correspond to a second quantity of active transponders. That is, the satellite may have N transponders providing coverage for a service region, while only $N_L$ transponders are active at the same time in the low-power mode and $N_H$ transponders are active at the same time in the high-power mode, where $N_L < N_H < N$.

In some examples, the payload may support beamforming. For on-board beamforming, the payload may include a first set of transmitters and a second set of transmitters. The first set of transmitters may be used to transmit signals to form beams in the low-power mode. For example, the first set of transmitters may have $N_1$ transmitters and an $N_1 \times K_1$ beam weight matrix may be used to generate $K_1$ user beams in the low-power mode. The second set of transmitters may have $N_2$ transmitters and an $(N_1+N_2) \times K_2$ beam weight matrix may be used to generate $K_2$ user beams in the high-power mode, where $K_2$ may be the same or different than $K_1$.

Similarly, for ground-based beamforming, the payload may include a first set of transmitters (e.g., $N_1$ transmitters) and a second set of transmitters (e.g., $N_2$ transmitters). The satellite may receive $N_1$ signals corresponding to respective transmitters in the satellite (e.g., frequency division multiplexed) from one or more access node terminals in the low-power mode and $N_1+N_2$ signals corresponding to respective transmitters in the satellite from the one or more access node terminals in the high-power mode. The one or more access node terminals may apply an $N_1 \times K_1$ beam weight matrix to generate $K_1$ user beams in the low-power mode and an $(N_1+N_2) \times K_2$ beam weight matrix to generate $K_2$ user beams in the high-power mode, where $K_2$ may be the same or different than $K_1$.

In some examples, the payload may support end-to-end beamforming. The payload may include a first set of transponders (e.g., that includes $N_1$ transponders) and an additional set of transponders (e.g., that includes $N_2$ additional transponders). While operating in the low-power mode, the baseline set of transponders may be used to receive signals from M access node terminals, where the received signals may be weighted (e.g., weighting each of $K_1$ beam signals for respective sets of one or more access node terminals) before transmission by the access node terminals to support beamforming for $K_1$ user beams. While operating in a high-power mode, the additional set of transponders may be activated. The first set and the additional set of transponders may receive signals from the M access node terminals, where the received signals may be weighted (e.g., weighting each of $K_2$ beam signals for respective sets of one or more access node terminals) to support beamforming for $K_2$ user beams. The weighting applied prior to transmission of the signals by the M access node terminals may be different in the low-power mode and in the high-power mode (e.g., to account for the higher number of active transponders). The number of user beams in the high-power mode (e.g., $K_2$) may be the same or different than the number of user beams in the low-power mode (e.g., $K_1$). The higher number of transponders may improve performance in the high-power mode for the user terminals via the $K_2$ user beams due to the higher total transmission power of the payload, different user beam characteristics (e.g., sharper roll-off), or different number of user beams. It should be noted that the present examples describe the forward link, while similar arrangements (e.g., a third set of amplifiers or transponders and a fourth set of amplifiers or transponders) may be made for the return link.

Additionally, or alternatively, each transponder may include more than one amplifier or an adjustable power amplifier. For example, the transponders may include adjustable power amplifiers, and the amplifiers may be configured to operate at a lower power in the low-power mode and at a higher power in the high-power mode. In some examples, the payload includes a first set of amplifiers and a second set of amplifiers. Where the transponders include multiple amplifiers of the same or different power, the payload may activate the first set of amplifiers in the low-power mode, and the second set of amplifiers may be deactivated. While operating in the high-power mode, the payload may activate the second set of amplifiers (e.g., and deactivate the first set of amplifiers) or both the first set of amplifiers and the second set of amplifiers.

At block 520, the thermal management system may store at least a portion of the excess thermal energy generated by the payload when the high-power mode is configured. The thermal management system may include a medium that transitions from a first phase (e.g., a solid phase) to a second phase (e.g., a liquid phase) as excess thermal energy (e.g., above the amount of thermal energy dissipated) is generated when the high-power mode is configured. In some cases, the temperature of the medium may remain constant (or nearly constant) during the transition period, where the temperature may be selected based on an operating temperature range for the payload.

At block 525, the power management system may identify that a demand for the communications service is below or is expected to be below a demand threshold. The power management system may identify that demand is below the demand threshold based on comparing a current (and/or future) level of demand indicated by a demand profile with the demand threshold. In some examples, the power management system of the satellite may identify that the demand is below or is expected to be below the demand threshold based on an indication from a ground station (e.g., from an access node 130 or network device 141).

At block 530, the payload may configure the low-power mode based on the level of demand being below (or being expected to be below) the demand threshold. In some examples, the payload may deactivate components (e.g., amplifiers, transponders, etc.) or modify a configuration of active components (e.g., a number of simultaneously active transponders) to operate in a mode that uses a decreased amount of power, as described herein and with reference to FIG. 2. In some examples, the power management system sends an indication to the payload indicating that the level of demand is below the demand threshold. Thus, the payload may consume electrical energy at a rate that is below the rate at which the power system is generating electrical energy. The excess electrical energy may be stored by the energy storage element. Also, the payload may generate thermal energy at a rate that is below the rate at which the thermal management system is dissipating electrical energy. Thus, an amount of stored electrical energy may increase while the payload is in the low-power mode.

At block 535, the thermal management system may dissipate thermal energy at a rate that exceeds a rate at which the thermal management system absorbs thermal energy from the payload when the payload is in the low-power mode. If the thermal management system includes a phase change medium, the phase change medium may partially or fully transition from the second phase back to the first phase when the payload is in the low-power mode. Thus, an amount of thermal energy stored (e.g., as heat in the payload or thermal management system, or in a medium) may decrease while the payload is in the low-power mode.

The power management system may continue to monitor a level of demand based on the demand profile. Thus, the power management system may repeat the operations described at block 510 through block 535. Also, the electrical energy generated at block 505 may be generated throughout the operation of block 510 through block 535. Although described as having two power modes (e.g., a low-power mode and a high-power mode) and two sub-intervals, the payload may have additional power modes. At least one of the modes may consume electrical energy at a rate greater than the average rate of the energy generation component (e.g., and/or generate thermal energy at a rate greater than an average dissipation rate of the thermal management component), and at least one of the modes may consume electrical energy at a rate less than the average rate of the energy generation component (e.g., and/or generate thermal energy at a rate less than the average dissipation rate of the thermal management component). For example, the payload may have three power modes, a first mode with a lowest electrical energy consumption, a second mode with an intermediate electrical energy consumption, and a third mode with a highest electrical energy consumption. In some examples where the payload has multiple amplifiers per feed, the payload may activate a first set of amplifiers in the first mode, deactivate the first set of amplifiers and activate a second set of amplifiers having higher power than the first set of amplifiers in the second mode, and activate both the first set of amplifiers and the second set of amplifiers in the third mode. In dynamic beam switching or beamforming systems, the payload may have a number of different power modes (e.g., two, three, four, five, or more), each corresponding to a different number of amplifiers or transponders that are activated.

Figure 6:
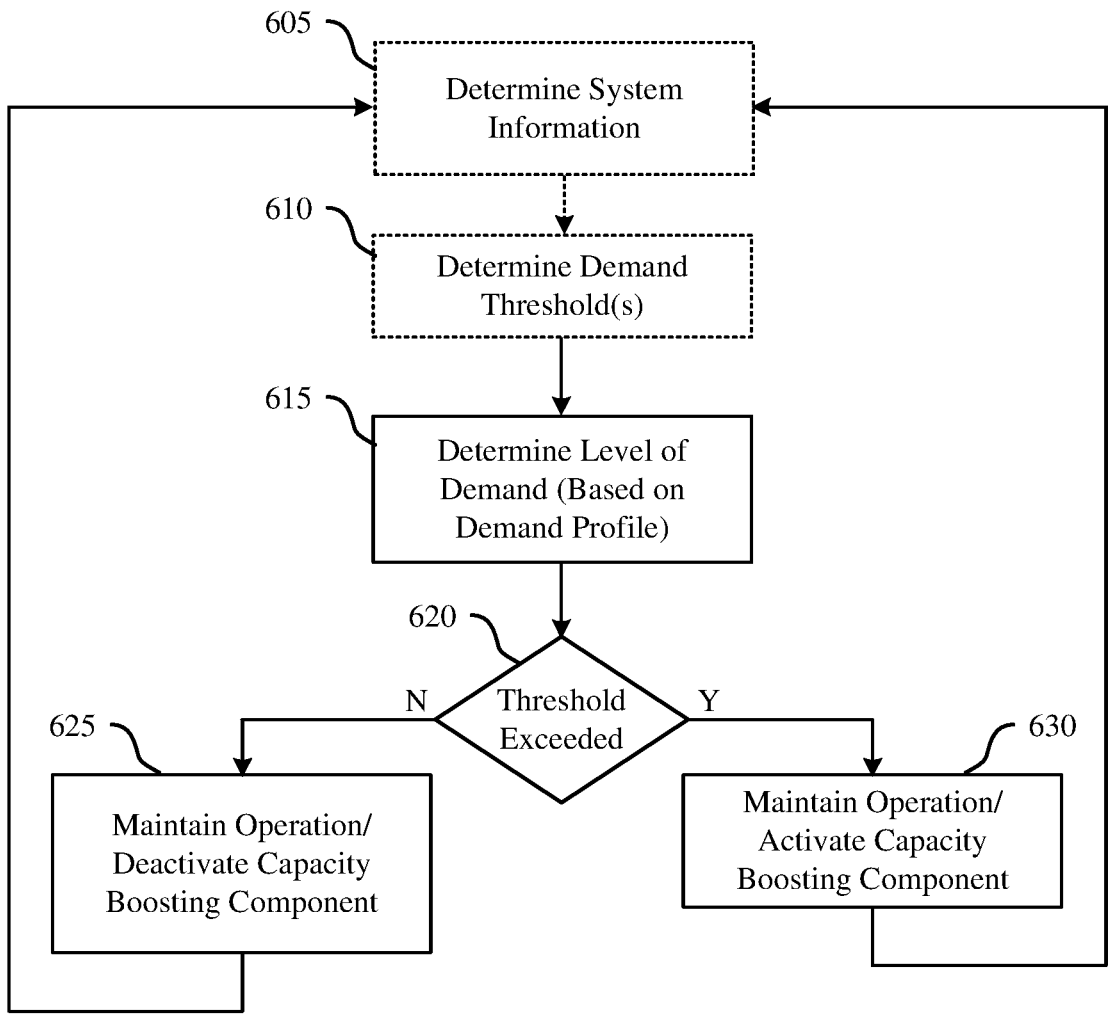
FIG. 6 shows a diagram of a process that supports modulating a capacity of a satellite in accordance with examples as disclosed herein.

FIG. 6 shows a diagram of a process that supports modulating a capacity of a satellite in accordance with examples as disclosed herein. Process flow 600 may be performed by a power management system 285 of a satellite, as described with reference to FIG. 2. Alternatively, process flow 600 may be performed by a ground-based device such as a NOC. One or more of the operations described in process flow 600 may be performed earlier or later in the process, omitted, replaced, supplemented, or any combination thereof. Also, additional operations described herein that are not included in process flow 600 may be included.

At block 605, the power management system may determine system information for the satellite. The power management system may determine an average or anticipated amount of power being generated by a power system, an amount of charge stored in an energy storage component, an average or anticipated amount of power being consumed by a payload, a temperature of the payload, and the like.

At block 610, the power management system may determine one or more demand thresholds. In some examples, the demand threshold(s) are programmed into the power management system. In other examples, the demand threshold(s) are determined by the power management system based on the system information and a demand profile. For example, the power management system may select a value for a demand threshold that is associated with a low-power interval of a first duration and a high-power interval of a second duration that results in the payload consuming power at an average rate that matches an average rate at which power is generated by the power system. In some examples, the power management system may determine a demand threshold based on an amount of charge stored by an energy storage component. For example, the power management system may increase the demand threshold if the energy storage component is not fully charged.

At block 615, the power management system may determine an anticipated level of demand for services provided by the satellite. The power management system may determine the anticipated level of demand by referencing a demand profile. The power management system may compare the anticipated level of demand with a demand threshold.

At block 620, the power management system may determine whether an anticipated level of demand is above or below the demand threshold. If the anticipated level of demand is below the demand threshold, the power management system may perform the operations described at block 625. If the anticipated level of demand is equal to or greater than the demand threshold, the power management system may perform the operations described at block 630. In some cases, the power management system compares an anticipated level of demand obtained using an averaging interval (e.g., of 5 to 10 minutes) against the demand threshold to avoid excessive switching between different power modes.

At block 625, the power management system may continue operations without modifying an operation of the payload—e.g., if the payload is already operating in a low-power mode. In some cases, the power management system may refrain from sending a mode configuration signal to the payload based on continuing operations. Or the power management system may modify the operation of the payload by configuring a low-power mode for the payload—e.g., if the payload is operating in a high-power mode. Configuring the low-power mode may include sending signal(s) that deactivate capacity boosting components (e.g., amplifiers, transponders, etc.) at the payload. The low-power mode may be configured as similarly described with reference to block 530 of FIG. 5.

At block 630, the power management system may continue operations without modifying an operation of the payload—e.g., if the payload is already operating in a high-power mode. Or the power management system may modify the operation of the payload by configuring a high-power mode for the payload—e.g., if the payload is operating in a low-power mode. Configuring the high-power mode may include sending signal(s) that activate capacity boosting components at the payload. The high-power mode may be configured as similarly described with reference to block 515 of FIG. 5.

Although generally discussed with reference to switching between two power modes, the power management system may be similarly configured to switch between additional (e.g., three or more) power modes. In such cases, multiple demand thresholds may be configured, and different combinations of communication components may be activated/deactivated accordingly. In some examples, the number of modes may be large, approximating an ability to contour the capacity to the demand. For example, where the satellite includes multiple transponders, each of multiple modes may correspond to a different number of active transponders.

Figure 7:
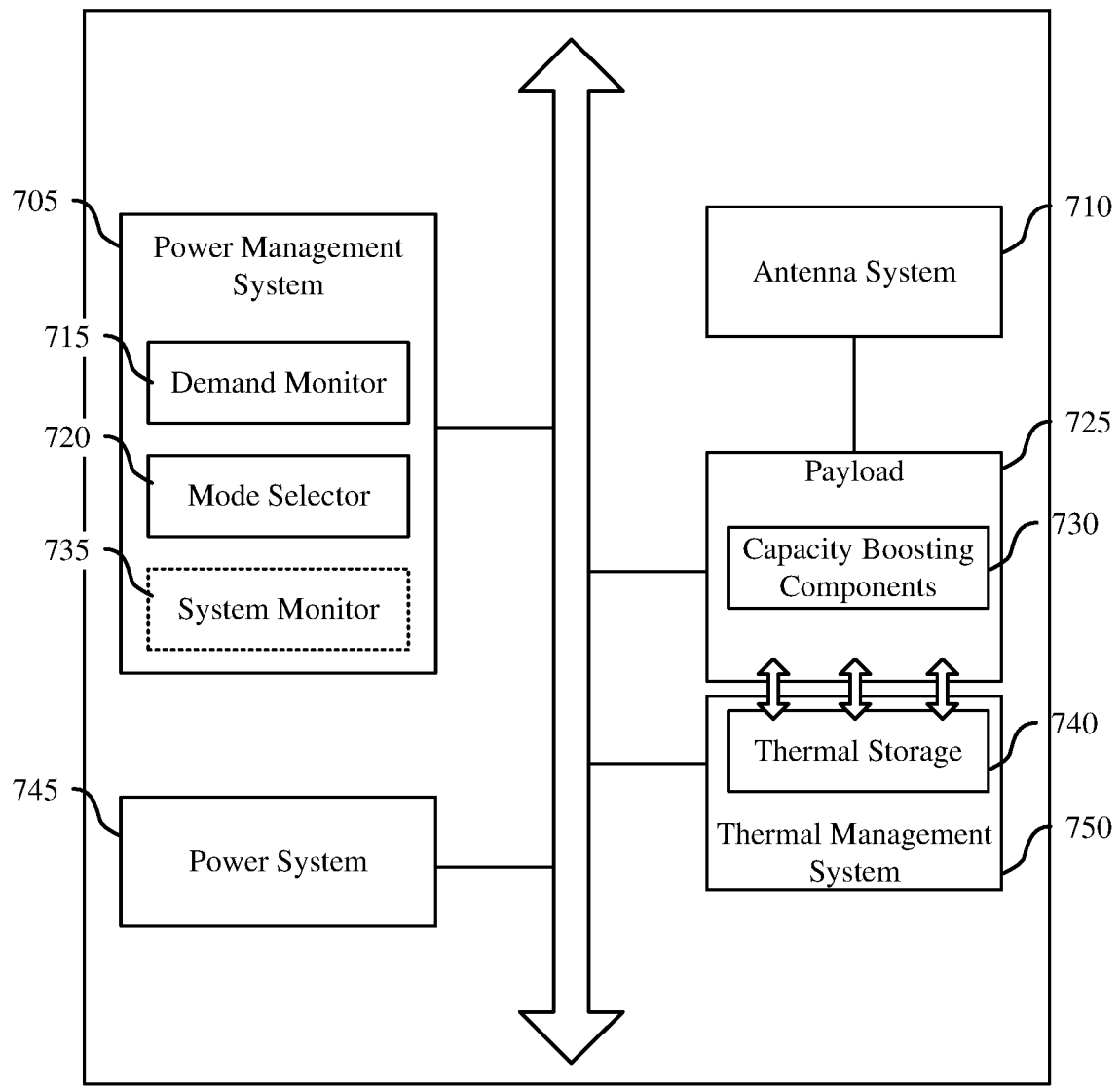
FIG. 7 shows a diagram of a process that supports modulating a capacity of a satellite in accordance with examples as disclosed herein.

FIG. 7 shows a diagram of a satellite that supports modulating a capacity of a satellite in accordance with examples as disclosed herein. Satellite 700 may include power management system 705, power system 745, antenna system 710, payload 725, and thermal management system 750. Alternatively, it should be understood that aspects of power management system 705 may be located in a NOC or other ground-based control system. Power management system 705 may include a processor or other intelligent hardware device (e.g., a central processing unit (CPU)), a microcontroller, memory, storage, an ASIC, etc. The memory or storage may include instructions that are configured to, when executed, cause a processor to perform various functions described herein.

Power management system 705 may be configured to configure (or assist in the configuration of) a high-power mode or low-power mode at payload 725 based on a demand profile. Power management system 705 may include demand monitor 715, mode selector 70, capacity boosting component 730, and system monitor 735.

Demand monitor 715 may be configured to compare a level of demand (or an expected level of demand) for a service provided by payload 725 with a demand threshold. Demand monitor 715 may determine when an anticipated level of demand is below a threshold and when the anticipated level of demand is equal to or above a threshold.

Mode selector 720 may be configured to select a power mode for payload 725—e.g., one of a low-power (low capacity) or high-power (high-capacity) mode for payload 725. Mode selector 720 may select a low-power mode based on demand monitor 715 identifying that the anticipated level of demand is below a threshold. Or mode selector 720 may select a high-power mode based on demand monitor 715 identifying that the anticipated level of demand is above a threshold.

System monitor 735 may be configured to monitor characteristics of satellite 700. For example, system monitor 735 may be configured to determine an average rate at which energy is being generated by power system 745, an amount of charge stored by power system 745, a temperature of payload 725, and the like. In some cases, system monitor 735 may be configured to determine a value for the threshold duration based on the monitored characteristics of satellite 700. In some cases, system monitor 735 may be configured to determine a duration for an off-peak interval and a duration for an on-peak interval based on the monitored characteristics of satellite 700.

Payload 725 may be configured to provide a service (e.g., a communication service) to access node terminals and/or user terminals. Payload 725 may further be configured to support varying data rates based on a demand profile that indicates an anticipated level of demand for the service provided by payload 725. To provide varying data rates, payload 725 may be configured to activate and deactivate additional components (e.g., amplifiers, transponders, etc.) and/or modify an operation of activated components. In some cases, payload 725 enters a high-power mode based on receiving an indication from power management system 705 indicating that an anticipated level of demand exceeds a demand threshold. In such cases, payload 725 may activate capacity boosting component 730, which may include activating additional amplifiers and/or transponders, switching between low-power and high-power amplifiers, and/or reconfiguring amplifiers to operate in a high-power mode.

Thermal management system 750 may be configured to process thermal energy generated by payload 725. Thermal management system 750 may be a passive or an active system. Thermal management system 750 may include thermal storage 740, which may be a pumped-fluid system, a phase change medium, or any combination thereof. Thermal storage 740 may be configured to absorb excess thermal energy generated by payload 725 while operating in a high-power mode and may dissipate at least a portion of the excess thermal energy while payload 725 operates in a low-power mode. When thermal management system 750 is an active system, thermal management system 750 may be activated by power management system 705—e.g., thermal management system may begin pumping fluid based on receiving an indication from power management system that payload 725 is operating in a high-power mode.

Antenna system 710 may be configured to receive and transmit signals to access node terminals and/or user terminals. Antenna system 710 may include a phased antenna array and a reflector. Antenna system 710 may include one or more antenna feed elements.

Power system 745 may be configured to generate electrical energy for satellite 700. Power system 745 may also be configured to supply electrical energy to components of satellite 700. Power system 745 may include an energy generation component (e.g., a solar array or radioisotope thermoelectric generator) and an energy storage component (e.g., a battery). Power system 745 may generate electrical energy at a constant rate that closely matches the average rate at which electrical energy is consumed by payload 725.

Power management system 705 and/or thermal management system 750 may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). In some cases, a single processor is used to implement power management system 705 and thermal management system 750. In other cases, separate processors are used to implement power management system 705 and thermal management system 750.

Figure 8:
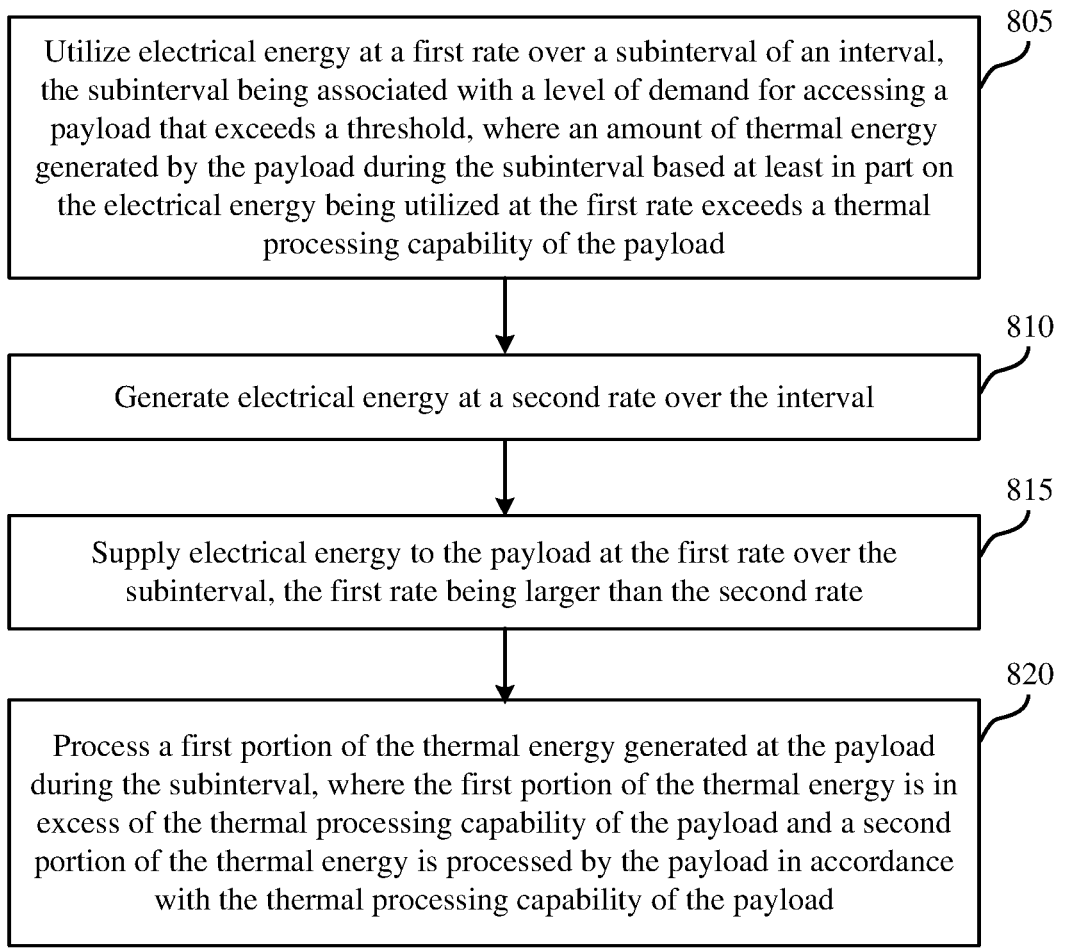
FIG. 8 shows a diagram of a process that supports modulating a capacity of a satellite in accordance with examples as disclosed herein.

FIG. 8 shows a diagram of a process that supports modulating a capacity of a satellite in accordance with examples as disclosed herein. The operation of method 800 may be implemented by a satellite or its components as described herein. In some examples, a processing system in the satellite may execute a set of instructions to control the functional elements of the satellite to perform the described functions. Additionally, or alternatively, the processing system may perform aspects of the described functions using special-purpose hardware.

At 805, electrical energy may be utilized at a first rate over a subinterval of an interval, the subinterval being associated with a level of demand for accessing a payload that exceeds a threshold, where an amount of thermal energy generated by the payload during the subinterval based at least in part on the electrical energy being utilized at the first rate exceeds a thermal processing capability of the payload. The operations of 805 may be performed according to the techniques described herein. In some examples, aspects of the operations of 805 may be performed by a payload (e.g., payload 230 of FIG. 2, payload 725 of FIG. 7, etc.) as described herein.

At 810, electrical energy may be generated at a second rate over the interval. The operations of 810 may be performed according to the techniques described herein. In some examples, aspects of the operations of 810 may be performed by a power system (e.g. using energy generation component 215 of power system 205 of FIG. 2, power system 745 of FIG. 7, etc.) as described herein.

At 815, electrical energy may be supplied to the payload at the first rate over the subinterval, the first rate being larger than the second rate. The operations of 815 may be performed according to the techniques described herein. In some examples, aspects of the operations of 815 may be performed by a power system (e.g., using energy storage component 220 of power system 205 of FIG. 2, power system 745 of FIG. 7, etc.) as described herein.

At 820, a first portion of the thermal energy generated at the payload during the subinterval may be processed, where the first portion of the thermal energy generated at the payload is in excess of the thermal processing capability of the payload and a second portion of the thermal energy generated at the payload during the subinterval is processed by the payload in accordance with the thermal processing capability of the payload. The operations of 820 may be performed according to the techniques described herein. In some examples, aspects of the operations of 820 may be performed by a thermal management component (e.g., thermal management system 290 of FIG. 2, thermal management system 750 of FIG. 7, etc.) as described herein.

In some examples, an apparatus as described herein may perform a method or methods, such as the method 800. The apparatus may include features, components, means, or instructions (e.g., a non-transitory computer-readable medium storing instructions executable by a processor) for storing (e.g., by power system 205 of FIG. 2, power system 745 of FIG. 7, etc.), a first amount of electrical energy at a beginning of the subinterval and a second amount of electrical energy that is less than the first amount of electrical energy at an end of the subinterval based at least in part on the first rate being greater than the second rate.

In some examples of the method 800 and the apparatus described herein, the subinterval corresponds to a period associated with a demand for accessing communication services provided by the payload that exceeds a threshold.

Some examples of the method 800 and the apparatus described herein may further include operations, features, components, means, or instructions for storing (e.g., by thermal management system 290 of FIG. 2, thermal management system 750 of FIG. 7, etc.) a first amount of the first portion of the thermal energy generated during the subinterval based at least in part on processing the first portion of the thermal energy generated at the payload during the subinterval.

In some examples of the method 800 and the apparatus described herein, during the subinterval, a medium of the thermal management component transitions from a first phase to a second phase during the subinterval based at least in part on absorbing the first amount of the first portion of the thermal energy generated during the subinterval.

In some examples of the method 800 and the apparatus described herein a temperature of the thermal management component remains within a range during a duration associated with the thermal management component transitioning from the first phase to the second phase. In some examples of the method 800 and the apparatus described herein the range includes a lower bound of 70 degrees Fahrenheit and an upper bound of 80 degrees Fahrenheit.

Some examples of the method 800 and the apparatus described herein may further include operations, features, components, means, or instructions for releasing, (e.g., by thermal management system 290 of FIG. 2, thermal management system 750 of FIG. 7, etc.) during a second subinterval, the first portion of the thermal energy generated during the subinterval that was stored during the subinterval.

Some examples of the method 800 and the apparatus described herein may further include operations, features, components, means, or instructions for utilizing (e.g., by payload 230 of FIG. 2, payload 725 of FIG. 7, etc.) electrical energy at a third rate over a second subinterval of the interval, wherein second thermal energy is generated by the payload during the second subinterval based at least in part on the electrical energy being utilized at the third rate, the second thermal energy generated during the second subinterval being within the thermal processing capability of the payload; supplying (e.g., by power system 205 of FIG. 2, power system 745 of FIG. 7, etc.) electrical energy to the payload at the third rate during the second subinterval, the third rate being smaller than the second rate; and releasing, (e.g., by thermal management component of FIG. 2, thermal management system 750 of FIG. 7, etc.) during the second subinterval, a second amount of the first portion of the thermal energy generated during the subinterval that was stored during the subinterval, where the second amount includes at least part of the first amount.

In some examples of the method 800 and the apparatus described herein the first rate is based at least in part on a second amount of thermal energy released during the second subinterval.

Some examples of the method 800 and the apparatus described herein may further include operations, features, components, means, or instructions for storing (e.g., by power system 205 of FIG. 2, power system 745 of FIG. 7, etc.) a first amount of electrical energy at an end of the subinterval and stores a second amount of electrical energy that is greater than the first amount of electrical energy at an end of the second subinterval based at least in part on the third rate being smaller than the second rate.

In some examples of the method 800 and the apparatus described herein the second subinterval corresponds to a period associated with a demand for accessing communication services provided by the payload that is below a threshold.

Some examples of the method 800 and the apparatus described herein may further include operations, features, components, means, or instructions for configuring (e.g., by power management system 285 of FIG. 2, power management system 705 of FIG. 7, etc.) the payload to support a first communications load during the subinterval, where the electrical energy is utilized at the first rate based at least in part on supporting the first communications load; and configuring the payload to support a second communications load during a second subinterval of the interval, where electrical energy is utilized by the payload at a third rate based at least in part on supporting the second communications load, the first communications load being greater than the second communications load.

In some examples of the method 800 and the apparatus described herein, configuring the payload to support the first communications load may include operations, features, components, means, or instructions for activating a first plurality of transponders and a second plurality of transponders; and configuring the payload to support the second communications load may include operations, features, components, means, or instructions for deactivating the second plurality of transponders.

In some examples of the method 800 and the apparatus described herein the first plurality of transponders is associated with a first polarization for communications and the second plurality of transponders is associated with a second, orthogonal polarization for communications. In some examples, the first plurality of transponders is associated with a first plurality of transmission beams that combine to serve a geographic area and the second plurality of transponders is associated with a second plurality of transmission beams that combine to serve the geographic area.

In some examples of the method 800 and the apparatus described herein, configuring the payload to support the first communications load may include operations, features, components, means, or instructions for configuring a plurality of amplifiers to operate in a first mode, where the plurality of amplifiers draw a first amount of power in the first mode; and configuring the payload to support the second communications load may include operations, features, components, means, or instructions for configuring the plurality of amplifiers to operate in a second mode, where the plurality of amplifiers draw a second amount of power in the second mode, the first amount of power being greater than the second amount of power.

In some examples of the method 800 and the apparatus described herein, configuring the payload to support the first communications load may include operations, features, components, means, or instructions for activating a first plurality of amplifiers and a second plurality of amplifiers; and configuring the payload to support the second communications load may include operations, features, components, means, or instructions for deactivating the second plurality of amplifiers.

In some examples of the method 800 and the apparatus described herein, configuring the payload to support the first communications load may include operations, features, components, means, or instructions for activating a first plurality of amplifiers; and configuring the payload to support the second communications load may include operations, features, components, means, or instructions for activating a second plurality of amplifiers, where the second plurality of amplifiers draw smaller amount of power than the first plurality of amplifiers.

It should be noted that the described techniques refer to possible implementations, and that operations and components may be rearranged or otherwise modified and that other implementations are possible. Further portions from two or more of the methods or apparatuses may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system for satellite communications, comprising:
a payload configured to utilize electrical energy at a first rate over a subinterval of an interval, the subinterval being associated with a level of demand for accessing the payload that exceeds a threshold, wherein thermal energy generated by the payload during the subinterval based at least in part on the electrical energy being utilized at the first rate exceeds a thermal processing capability of the payload;
a power system configured to generate electrical energy at a second rate over the interval and to supply electrical energy to the payload at the first rate over the subinterval, the first rate being larger than the second rate, wherein the power system comprises an energy storage component configured to supply at least a portion of the electrical energy supplied to the payload at the first rate over the subinterval; and
a thermal management component configured to process a first portion of the thermal energy generated at the payload during the subinterval, wherein the first portion of the thermal energy generated at the payload is in excess of the thermal processing capability of the payload, and wherein a second portion of the thermal energy generated at the payload during the subinterval is processed by the payload in accordance with the thermal processing capability of the payload,
wherein the thermal management component is further configured to:
store a first amount of the first portion of the thermal energy generated during the subinterval based at least in part on processing the first portion of the thermal energy generated at the payload during the subinterval, and
release, during a second subinterval of the interval, the first amount of the first portion of the thermal energy generated during the subinterval that was stored during the subinterval,
wherein the payload is configured to utilize electrical energy at a third rate over the second subinterval, the third rate being smaller than the second rate.

2. The system of claim 1, wherein the energy storage component configured to:
store a first amount of electrical energy at a beginning of the subinterval; and
store a second amount of electrical energy that is less than the first amount of electrical energy at an end of the subinterval based at least in part on the first rate being greater than the second rate.

3. The system of claim 1, wherein the subinterval corresponds to a period associated with the demand for accessing communication services provided by the payload that exceeds the threshold.

4. The system of claim 1, wherein the thermal management component comprises:
a medium, wherein at least a portion of the medium is configured to transition from a first phase to a second phase during the subinterval based at least in part on absorbing the first amount of the first portion of the thermal energy generated during the subinterval.

5. The system of claim 4, wherein a temperature of the thermal management component is configured to remain within a range during a duration associated with the thermal management component transitioning from the first phase to the second phase.

6. The system of claim 4, wherein:
second thermal energy is generated by the payload during the second subinterval based at least in part on the electrical energy being utilized at the third rate, the second thermal energy generated during the second subinterval being within the thermal processing capability of the payload; and
the power system is configured to supply electrical energy to the payload at the third rate during the second subinterval.

7. The system of claim 6, wherein the first rate is based at least in part on second thermal energy released by the payload during the second subinterval.

8. The system of claim 6, wherein the energy storage component of the power system is configured to:
store a first amount of electrical energy at an end of the subinterval; and
store a second amount of electrical energy that is greater than the first amount of electrical energy at an end of the second subinterval based at least in part on the third rate being smaller than the second rate.

9. The system of claim 6, wherein the second subinterval corresponds to a period associated with the demand for accessing communication services provided by the payload that is below the threshold.

10. The system of claim 1, wherein the power system comprises:
a solar array configured to generate the electrical energy at the second rate over the interval.

11. The system of claim 1, further comprising:
first transponders that are associated with a first polarization for communications; and
second transponders that are associated with a second, orthogonal polarization for communications, wherein:
the payload is configured to activate both the first transponders and the second transponders during the subinterval, and
the payload is configured to activate one of the first transponders or the second transponders during the second subinterval of the interval.

12. The system of claim 1, further comprising:
first transponders that are associated with first transmission beams that combine to serve a geographic area; and
second transponders that are associated with second transmission beams that combine to serve the geographic area, wherein:
the payload is configured to activate both the first transponders and the second transponders during the subinterval, and
the payload is configured to activate one of the first transponders or the second transponders during the second subinterval of the interval.

13. The system of claim 1, further comprising:
a plurality of transponders, wherein:
a first set of signals from a first quantity of the plurality of transponders are combined during the subinterval to form first transmission beams that serve a geographic area, and
a second set of signals from a second quantity of the plurality of transponders are combined during the second subinterval of the interval to form second transmission beams that serve the geographic area, the first quantity being greater than the second quantity.

14. The system of claim 1, further comprising:
amplifiers that are configurable to draw either a first amount of power or a second amount of power that is less than the first amount of power, wherein:
the amplifiers are configured to draw the first amount of power during the subinterval, and
the amplifiers are configured to draw the second amount of power during the second subinterval of the interval.

15. The system of claim 1, further comprising:
first amplifiers; and
second amplifiers, wherein:
the payload is configured to activate both the first amplifiers and the second amplifiers during the subinterval, and
the payload is configured to activate one of the first amplifiers or the second amplifiers during the second subinterval of the interval.

16. The system of claim 1, further comprising:
first amplifiers configured to draw a first amount of power; and
second amplifiers configured to draw a second amount of power that is less than the first amount of power, wherein:
the payload is configured to activate the first amplifiers and deactivate the second amplifiers during the subinterval, and
the payload is configured to deactivate the first amplifiers and activate the second amplifiers during the second subinterval of the interval.

17. A method for satellite communications, comprising:
utilizing, by a payload, electrical energy at a first rate over a subinterval of an interval, the subinterval being associated with a level of demand for accessing the payload that exceeds a threshold, wherein thermal energy generated by the payload during the subinterval based at least in part on the electrical energy being utilized at the first rate exceeds a thermal processing capability of the payload;
generating, by a power system, electrical energy at a second rate over the interval;
supplying, by the power system, electrical energy to the payload at the first rate over the subinterval, the first rate being larger than the second rate, wherein at least a portion of the electrical energy supplied to the payload at the first rate is supplied by an energy storage component of the power system;
processing, at a thermal management component, a first portion of the thermal energy generated at the payload during the subinterval, wherein the first portion of the thermal energy generated at the payload is in excess of the thermal processing capability of the payload, and wherein a second portion of the thermal energy generated at the payload during the subinterval is processed by the payload in accordance with the thermal processing capability of the payload; storing, by the thermal management component, a first amount of the first portion of the thermal energy generated during the subinterval based at least in part on processing the first portion of the thermal energy generated at the payload during the subinterval;
utilizing, by the payload, electrical energy at a third rate over a second subinterval of the interval, the third rate being smaller than the second rate; and
releasing, by the thermal management component during the second subinterval, the amount of the first portion of the thermal energy generated during the subinterval that was stored during the subinterval.

18. The method of claim 17, further comprising:
storing, by the power system, a first amount of electrical energy at a beginning of the subinterval and a second amount of electrical energy that is less than the first amount of electrical energy at an end of the subinterval based at least in part on the first rate being greater than the second rate.

19. The method of claim 17, wherein the subinterval corresponds to a period associated with the demand for accessing communication services provided by the payload that exceeds the threshold.

20. The method of claim 17, wherein a medium of the thermal management component transitions from a first phase to a second phase during the subinterval based at least in part on absorbing the first amount of the first portion of the thermal energy generated during the subinterval.

21. The method of claim 20, wherein a temperature of the thermal management component remains within a range during a duration associated with the thermal management component transitioning from the first phase to the second phase.

22. The method of claim 21, wherein the range comprises a lower bound of 70 degrees Fahrenheit and an upper bound of 80 degrees Fahrenheit.

23. The method of claim 17, wherein:
second thermal energy is generated by the payload during the second subinterval based at least in part on the electrical energy being utilized at the third rate, the second thermal energy generated during the second subinterval being within the thermal processing capability of the payload; and
supplying, by the power system, electrical energy to the payload at the third rate during the second subinterval, the third rate being smaller than the second rate.

24. The method of claim 23, wherein the first rate is based at least in part on a second thermal energy released by the payload during the second subinterval.

25. The method of claim 23, further comprising:
storing, by the power system, a first amount of electrical energy at an end of the subinterval and storing a second amount of electrical energy that is greater than the first amount of electrical energy at an end of the second subinterval based at least in part on the third rate being smaller than the second rate.

26. The method of claim 23, wherein the second subinterval corresponds to a period associated with a demand for accessing communication services provided by the payload that is below the threshold.

27. The method of claim 17, wherein:
configuring the payload to support a first communications load comprises activating a first plurality of transponders and a second plurality of transponders; and
configuring the payload to support a second communications load comprises deactivating the second plurality of transponders.

28. The method of claim 27, wherein the first plurality of transponders is associated with a first polarization for communications and the second plurality of transponders is associated with a second, orthogonal polarization for communications.

29. The method of claim 27, wherein the first plurality of transponders is associated with a first plurality of transmission beams that combine to serve a geographic area and the second plurality of transponders is associated with a second plurality of transmission beams that combine to serve the geographic area.

30. The method of claim 17, wherein:
configuring the payload to support a first communications load comprises configuring a plurality of amplifiers to operate in a first mode, wherein the plurality of amplifiers draw a first amount of power in the first mode; and
configuring the payload to support a second communications load comprises configuring the plurality of amplifiers to operate in a second mode, wherein the plurality of amplifiers draw a second amount of power in the second mode, the first amount of power being greater than the second amount of power.

31. The method of claim 17, wherein:
configuring the payload to support a first communications load comprises activating a first plurality of amplifiers and a second plurality of amplifiers; and
configuring the payload to support a second communications load comprises deactivating the second plurality of amplifiers.

32. The method of claim 17, wherein:
configuring the payload to support a first communications load comprises activating a first plurality of amplifiers; and
configuring the payload to support a second communications load comprises activating a second plurality of amplifiers, wherein the second plurality of amplifiers draw a smaller amount of power than the first plurality of amplifiers.

33. The system of claim 1, wherein the payload comprises components configured to support communications services provided by the payload, and wherein the payload is further configured to:
configure the components to support a first communications load during the subinterval, wherein the payload is configured to utilize the electrical energy at the first rate based at least in part on the components being configured to support the first communications load, and
configure the components to support a second communications load during the second subinterval of the interval, wherein the payload is configured to utilize the electrical energy at the third rate based at least in part on the components being configured to support the second communications load, the first communications load being greater than the second communications load.

34. The system of claim 1, wherein the power system comprises a battery that supplies at least a portion of the electrical energy supplied to the payload at the first rate over the subinterval.

35. The method of claim 17, further comprising:
configuring the payload to support a first communications load during the subinterval, wherein at least a portion of the electrical energy supplied to the payload at the first rate is supplied by the energy storage component of the power system; and
configuring the payload to support a second communications load during the second subinterval of the interval, wherein electrical energy is utilized by the payload at the third rate based at least in part on being configured to support the second communications load, the first communications load being greater than the second communications load.

* * * * *